(12) United States Patent
Sagara

(10) Patent No.: US 7,768,880 B2
(45) Date of Patent: Aug. 3, 2010

(54) REPRODUCING APPARATUS, AND METHOD OF ADJUSTING SPHERICAL ABERRATION CORRECTION AND FOCUS BIAS

(75) Inventor: Seiichi Sagara, Chiba (JP)

(73) Assignee: Sony Corporation (JP)

( * ) Notice: Subject to any disclaimer, the term of this patent is extended or adjusted under 35 U.S.C. 154(b) by 598 days.

(21) Appl. No.: 11/601,582

(22) Filed: Nov. 17, 2006

(65) Prior Publication Data

US 2007/0159951 A1   Jul. 12, 2007

(30) Foreign Application Priority Data

Nov. 18, 2005   (JP) .............................. P2005-334137

(51) Int. Cl.
G11B 7/00 (2006.01)
G11B 27/36 (2006.01)
G11B 11/00 (2006.01)
G11B 15/62 (2006.01)
G11B 17/32 (2006.01)
G11B 20/18 (2006.01)

(52) U.S. Cl. ............... 369/44.23; 369/53.19; 369/44.32

(58) Field of Classification Search ....................... None
See application file for complete search history.

(56) References Cited

U.S. PATENT DOCUMENTS

| | | | | |
|---|---|---|---|---|
| 6,151,154 A | * | 11/2000 | Ogasawara et al. | 359/279 |
| 2003/0107961 A1 | * | 6/2003 | Yasuda et al. | 369/44.27 |
| 2004/0136281 A1 | * | 7/2004 | Yanagisawa et al. | 369/44.32 |
| 2004/0174781 A1 | * | 9/2004 | Nishi | 369/44.32 |
| 2004/0218484 A1 | * | 11/2004 | Kuze et al. | 369/44.23 |
| 2006/0104183 A1 | * | 5/2006 | Kataoka et al. | 369/112.01 |

FOREIGN PATENT DOCUMENTS

| | | |
|---|---|---|
| JP | 9251645 | 9/1997 |
| JP | 10269611 | 10/1998 |
| JP | 2000-011388 | 1/2000 |
| JP | 2000285484 | 10/2000 |
| JP | 2002352449 | 12/2002 |

* cited by examiner

Primary Examiner—Hoa T Nguyen
Assistant Examiner—Emily Frank
(74) Attorney, Agent, or Firm—Lerner, David, Littenberg, Krumholz & Mentlik, LLP

(57) ABSTRACT

A reproducing apparatus includes a head unit operable to direct a laser light beam onto a recording medium, the head unit having a focus servo mechanism and a spherical aberration correction mechanism for laser light; an evaluation signal generating unit operable to generate an evaluation signal serving as an index of quality of a reproduced signal; a focus servo unit operable to perform a focus servo operation by driving the focus servo mechanism in response to a focus error signal; a spherical aberration correction unit operable to perform spherical aberration correction by driving the spherical aberration correction mechanism in response to a spherical aberration correction value; a focus bias unit operable to add a focus bias to a focus loop containing the focus servo unit; and a control unit operable to control adjustment of a spherical aberration correction value and a focus bias value to be set in the spherical aberration correction unit and the focus bias unit, respectively.

9 Claims, 19 Drawing Sheets

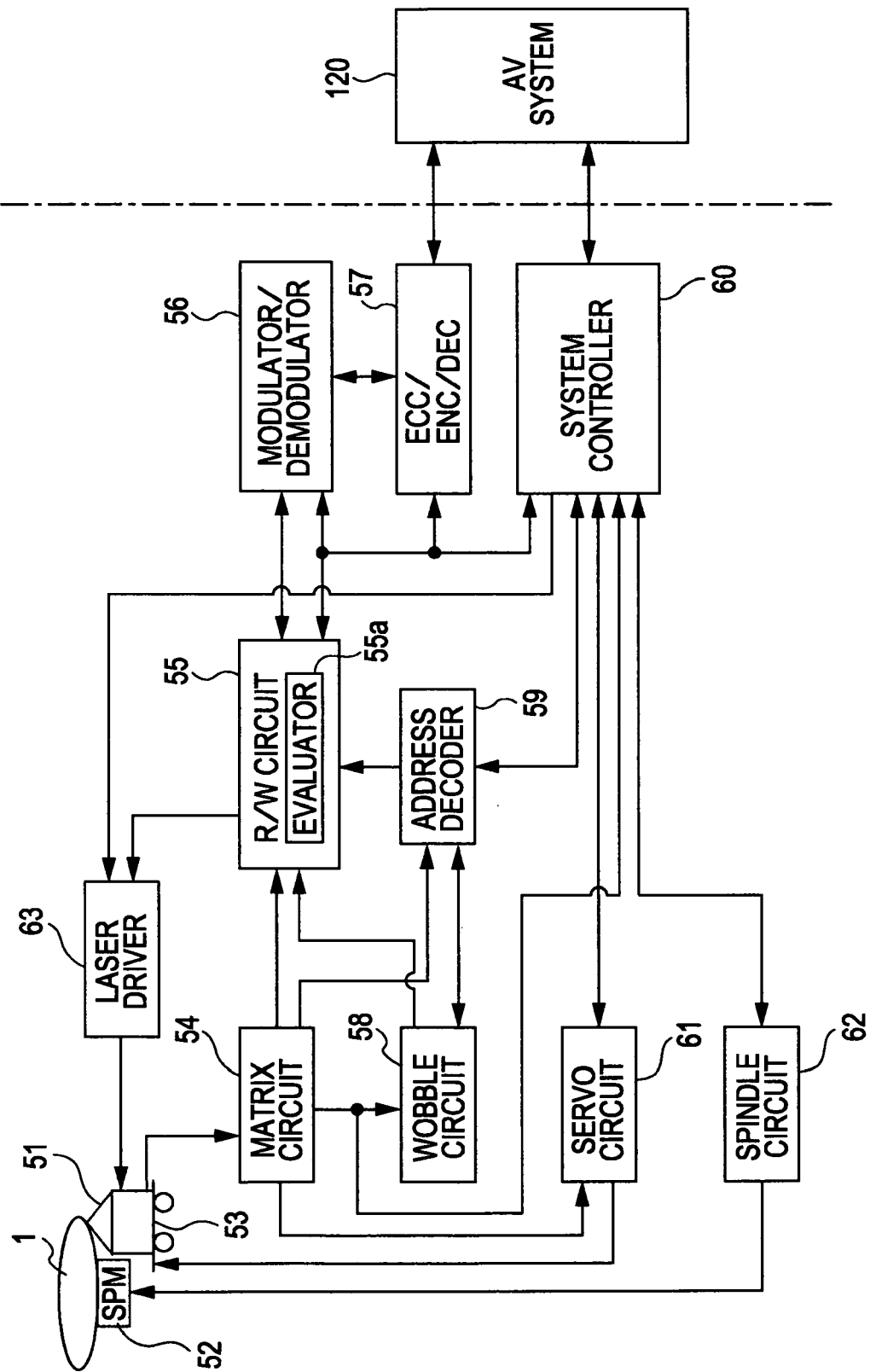

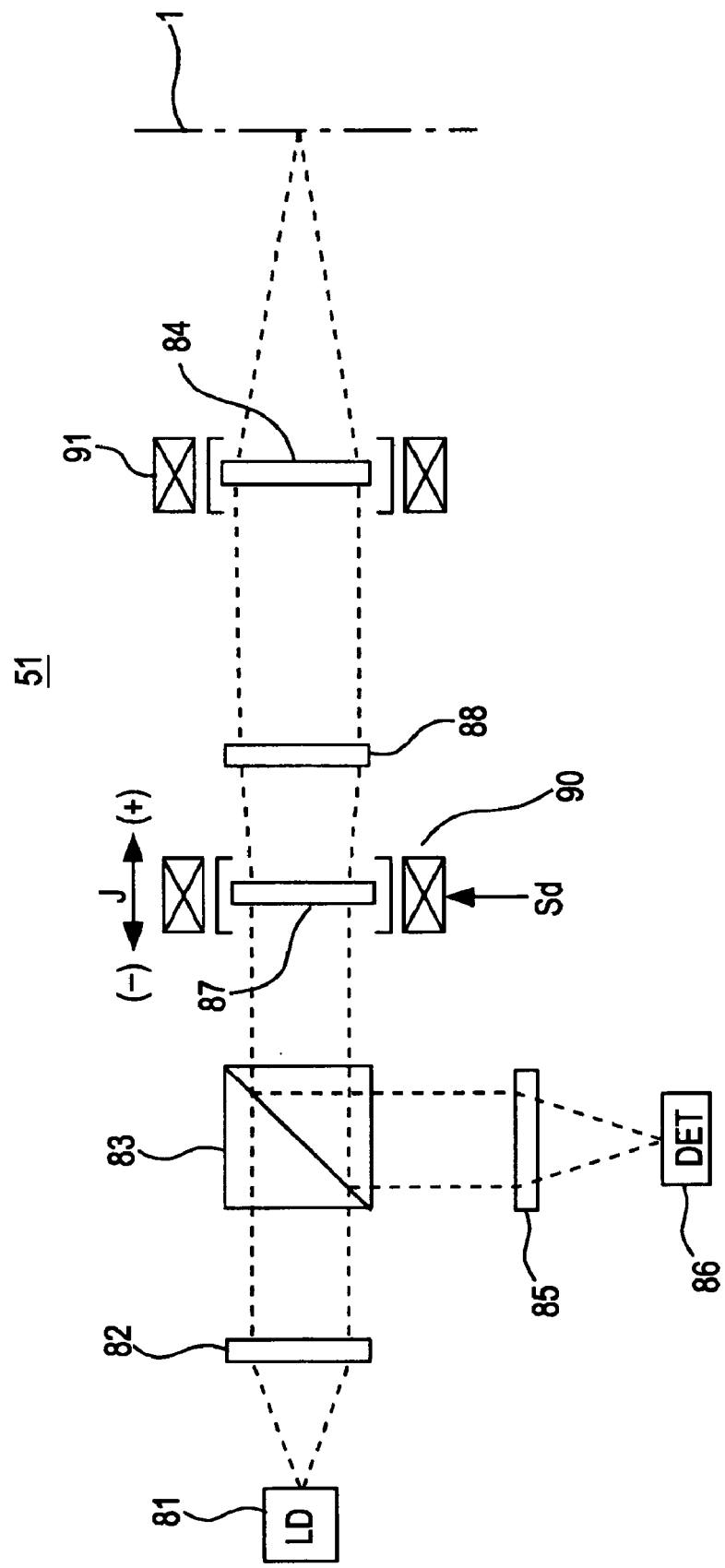

- PRIOR ART -

- PRIOR ART -

REPRODUCING APPARATUS, AND METHOD OF ADJUSTING SPHERICAL ABERRATION CORRECTION AND FOCUS BIAS

CROSS-REFERENCE TO RELATED APPLICATIONS

The present application claims priority from Japanese Patent Application No. JP 2005-334137 filed on Nov. 18, 2005, the disclosure of which is hereby incorporated by reference herein.

BACKGROUND OF THE INVENTION

1. Field of the Invention

The present invention relates to a reproducing apparatus for at least reproducing a signal from a recording medium and a method of adjusting a spherical aberration correction value and a focus bias value.

2. Description of the Related Art

Data recording techniques are available to record and play digital data on recording media such as optical disks including a compact disk (CD), mini-disk (MD®), and digital versatile disk (DVD). The optical disks are a general term referring to recording media constructed of a thin metal disk covered with a protective plastic film. When a laser beam is directed to the disk, a change in a reflected light beam is read.

The optical disks include play only types such as CD (compact disk), CD-ROM (compact disk read-only memory), and DVD-ROM, and recordable types such as MD, CD-R (compact disk writable), CD-RW (compact disk re-writable), DVD-R (digital versatile disk writable), DVD-RW (digital versatile disk re-writable), DVD+RW (digital versatile disk plus re-writable), and DVD-RAM (digital versatile disk random-access memory). The recordable type optical disks record data using magneto-optical recording technique, phase change recording technique, or dye-doped film change recording technique. The dye-doped film change recording technique, also referred to as write-once recording technique, causes data to be written one time only with no rewriting operation permitted. The dye-doped film change is appropriate for archival purposes. On the other hand, the magneto-optical recording and the phase change recording permit data to be rewritten and find applications to record a variety of content data including music, video, gaming, and other applications.

Recently developed high-density optical disks, called blu-ray disks, stores a vast amount of data.

The high-density optical disks including the blu-ray disk are coated with a cover film of 0.1 mm thickness in the direction of thickness, and data is reproduced (or recorded) thereon using a combination of a laser of wavelength of 405 nm (so-called blue laser) and an objective lens of 0.85 numerical aperture (NA).

As is known, a recording and reproducing apparatus for recording and reproducing data on the optical disk performs a focus servo operation controlling a focal point of a laser beam onto a disk recording surface, and a tracking servo operation controlling the laser light beam to trace a track (a bit train or a groove) on the disk.

The focus servo operation is performed to add an appropriate focus bias to a focus loop.

The high-density optical disk requires a spherical aberration correction to address a thickness tolerance of the cover film and a multi-layer recording structure. For example, an optical pickup including a spherical aberration correction mechanism employing an expander or a liquid crystal device has been developed as disclosed in Japanese Unexamined Patent Application Publications Nos. 2002-352449 and 10-269611.

Since a recording and reproducing apparatus employing an high NA lens for the blu-ray disk has a narrow margin for focus bias and spherical aberration, automatic adjustment of the focus bias and the spherical aberration is important.

A method of adjusting focus bias is disclosed in Japanese Unexamined Patent Application Publication No. 2000-285484.

A method of adjusting spherical aberration is disclosed in Japanese Unexamined Patent Application Publication No. 9-251645.

A method of adjusting both focus bias and spherical aberration is disclosed in Japanese Unexamined Patent Application Publication No. 2000-11388.

As disclosed in Japanese Unexamined Patent Application Publication Nos. 2000-285484, 9-251645, and 2000-11388, a signal is read with the focus bias and the spherical aberration correction value successively changed and a combination of a focus bias and a spherical aberration correction value providing the best evaluation value obtained from the read signal is identified in the known art. The recording and playing operation are then performed with the thus identified focus bias and spherical aberration correction value set.

In accordance with the known art, the focus bias and the spherical aberration correction value are set based on the actually measured evaluation signal. For example, if a focus error signal is offset due to aging, or if a spherical aberration takes place due to variations in the cover film thickness from disk to disk or even within the surface of the same disk, quality degradation in the recording and playing operation of the signal is controlled.

Since adjustment is performed to achieve the best evaluation value, some degree of margin covers a change in focus and spherical aberration due to temperature change or disk surface flatness distortion that could take place after the adjustment.

Adjustment of the focus bias value and the spherical aberration correction value is preferably performed with a required margin maintained as shown in FIGS. 18 and 19 just in case a change occurs in focus and spherical aberration due to temperature change or disk surface flatness distortion that could take place after the adjustment.

FIG. 18 illustrates a two-dimensional contour lines representing characteristics of a value of an evaluation signal (a jitter value herein) with the spherical aberration correction value plotted in the abscissa and the focus bias value plotted in the ordinate. FIG. 19 illustrates a three-dimensional contour lines of characteristics of the value of the evaluation signal (the jitter value) with the spherical aberration correction value plotted in the abscissa and the focus bias value plotted in the ordinate.

A required margin W is defined by a range within which the focus and the spherical aberration can shift due to the temperature change and the disk flatness non-uniformity. By adjusting the spherical aberration correction value and the focus bias value at the center position of the margin W (margin center position Pm-cent), the signal recording and playing operation quality is maintained within an assumed range in response to a change in the spherical aberration and focus subsequent to the adjustment.

In accordance with the above-described known method of adjusting the spherical aberration correction value and the focus bias value, the spherical aberration correction value and the focus bias value are adjusted to reach the best value of the evaluation signal taking into consideration the margin W.

The spherical aberration correction value and the focus bias value are thus adjusted to reach the best value of the evaluation signal. If the contour line of the valuation value is plotted in a regular ellipse extending both in a spherical aberration correction value direction and in a focus bias value direction, an adjustment point becomes equivalent to the margin center Pm-cent, and a good signal recording and playing operation quality is maintained against a change in focus and spherical aberration due to the temperature change and the disk flatness non-uniformity. More specifically, if the contour line becomes a regular ellipse, the best value of the evaluation signal, namely, the center of each contour line becomes the optimum point taking into consideration the margin.

If the contour line of the evaluation characteristics is distorted as shown in FIG. 18, the known technique of adjusting to the center of the contour line can fail to provide a sufficient margin in the focus and spherical aberration after the adjustment.

More specifically, the adjustment point with the adjustment performed to the center (peak) of the contour line becomes Pm1. With the adjustment performed to the adjustment point Pm1, characteristics of the evaluation signal are sharply degraded if a change occurs after the adjustment in the Y direction in which spacing between contour lines is narrow. As a result, a sufficient recording and playing operation quality cannot be maintained against the temperature change and the disk flatness non-uniformity.

In another technique of adjusting the spherical aberration correction value and the focus bias value in the margin, each of the spherical aberration correction value and the focus bias value is adjusted toward the margin center one dimensional direction by one dimensional direction.

As shown in FIG. 18, the spherical aberration correction value and the focus bias value are adjusted to the respective values thereof (adjustment point Pm2) in the directions thereof taking into consideration the margin responsive to the temperature change and the disk flatness non-uniformity.

Even with this technique, the adjustment cannot be performed to the margin center Pm-cent of the margin W if the contour lines of the evaluation characteristics are deformed as shown in FIG. 18. If a change takes place in the Y direction, the characteristics become sharply degraded. As a result, no sufficient signal recording and playing operation quality cannot be achieved.

The contour lines of the evaluation characteristics are particularly deformed when an optical pickup having an aberration is used or when an error value or a deviation value from an ideal value is used as an evaluation value with a partial response maximum likelihood (PRML) decoding used to binarize a playback signal. In such a case, the problem is worsened.

SUMMARY OF THE INVENTION

In accordance with one embodiment of the present invention, a reproducing apparatus is arranged as described below.

The reproducing apparatus for reproducing data from a recording medium includes a head unit operable to direct a laser light beam onto the recording medium and to detect laser light reflected from the recording medium to read the data, the head unit having a focus servo mechanism and a spherical aberration correction mechanism for laser light; an evaluation signal generating unit operable to generate an evaluation signal serving as an index of quality of a reproduced signal based on the reflected light obtained in the head unit; a focus servo unit operable to perform a focus servo operation by driving the focus servo mechanism in response to a focus error signal generated as a signal responsive to the reflected light detected by the head unit; a spherical aberration correction unit operable to perform spherical aberration correction by driving the spherical aberration correction mechanism in response to a spherical aberration correction value; a focus bias unit operable to add a focus bias to a focus loop containing the focus servo unit; and a control unit operable to control adjustment of a spherical aberration correction value to be set in the spherical aberration correction unit and a focus bias value to be set in the focus bias unit, wherein when a center point of an assumed margin predetermined for each of the spherical aberration correction value and the focus bias value is shifted to a shift point within a predetermined search range, the value of the evaluation signal is obtained at each of a plurality of predetermined points within the assumed margin with respect to each shift point, the evaluation signal having the worst value from among the plurality of predetermined points is set to have a representative value of each shift point, and the spherical aberration correction value to be set in the spherical aberration correction unit and the focus bias value to be set in the focus bias unit are adjusted based on the spherical aberration correction value at the center point when any of the representative values of the shift points having a value of the evaluation signal that is better by a predetermined amount is obtained.

As previously discussed, the assumed margin is a range of deviation that is expected in the spherical aberration and the focus subsequent to the adjustment of the spherical aberration correction value and the focus bias value. The assumed margin is determined to have the same shape and the same area as a (required) margin.

The assumed margin is shifted with the center thereof remaining within the predetermined search range, and the worst one of the evaluation signal values of the shift points is set to be the representative value. The spherical aberration correction value and the focus bias value are adjusted based on the spherical aberration correction value and the focus bias value at the center point when any of the representative values of the shift points having a value of the evaluation signal that is better by a predetermined amount is obtained.

From among the assumed margins shifted to the plurality of positions, a position of the assumed margin providing the best representative value may be closest to an optimum margin. If the spherical aberration correction value and the focus bias value are adjusted to the center point of the assumed margin providing the representative value equal to or better than the predetermined level, the spherical aberration correction value and the focus bias value may have the required margin center with the largest margin against a deviation in the focus and spherical aberration after the adjustment.

In accordance with embodiments of the present invention, the assumed margin is shifted to be two-dimensionally fitted with an optimum margin position. The two-dimensional fitting process is different from the known method of adjusting to the center position of the contour lines and the known method of adjusting to the center position taking into consideration each one dimensional margin. Using the two-dimensional fitting process, the margin center position is reliably reached even if the contour line of the evaluation signal value is deformed.

In accordance with embodiments of the present invention, the spherical aberration correction value and the focus bias value can be adjusted to the margin center position even when the contour lines of the values of the evaluation signals are deformed.

Even when an optical pickup having an aberration is used or even when an error value or a deviation value from an ideal value is used as an evaluation value with a partial response maximum likelihood (PRML) decoding used to binarize a playback signal, the spherical aberration correction value and the focus bias value are adjusted to the margin center position.

With the spherical aberration correction value and the focus bias value adjusted to the margin center, the signal recording and reproducing operation quality is assured to within the specifications even when the focus and the spherical aberration are deviated due to the temperature change and the disk flatness non-uniformity subsequent to the adjustment.

BRIEF DESCRIPTION OF THE DRAWINGS

FIG. 1 is a block diagram illustrating a reproducing apparatus in accordance with one embodiment of the present invention;

FIG. 2 illustrates a spherical aberration correction mechanism in the reproducing apparatus in accordance with one embodiment of the present invention;

FIGS. 4A-1 and 4A-2 and 4B illustrate a concept of adjusting a spherical aberration correction value and a focus bias value in accordance with one embodiment of the present invention;

DETAILED DESCRIPTION

Figures 1, 4A:
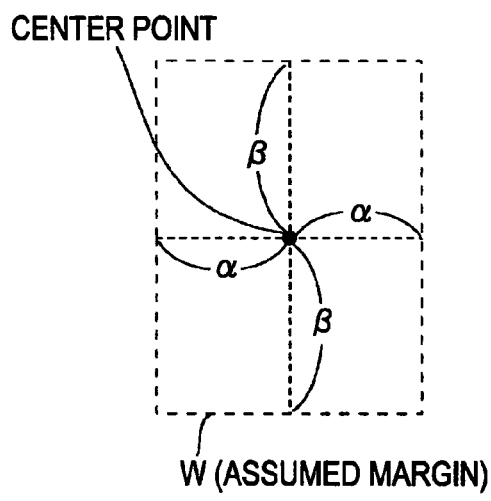

FIG. 1 is a block diagram illustrating a reproducing apparatus in accordance with one embodiment of the present invention. In accordance with the one embodiment of the present invention, the reproducing apparatus is a recording and reproducing apparatus recording and reproducing a signal on an optical recording medium.

As shown in FIG. 1, an optical disk 1 is a writeable disk storing data in a phase change method, for example. A groove wobbling on the disk serves as a recording track. Address information as address in pre-groove (ADIP) information may be embedded in groove wobbling depending on the groove wobbling type.

The optical disk 1 is placed on a turn table (not shown) and rotated at a constant linear velocity (CLV) by a spindle motor during recording and reproducing operations.

An optical pickup (optical head) 51 reads the ADIP information embedded in the wobble of a groove track on the optical disk 1.

During the recording operation, the optical pickup 51 records user data in a phase change mark on a track, and during the reproducing operation, the optical pickup 51 reads the phase change mark.

The optical pickup 51 includes a laser diode serving as a laser light source, a photodetector detecting reflected light, an objective lens serving as an output terminal of laser light, and an optical system (to be discussed later) for directing a laser light beam to a disk recording surface through the objective lens, and for guiding the laser light reflected from the disk recording surface toward the photodetector.

The optical pickup 51 holds the objective lens in a manner such that the objective lens is movable in a tracking direction and a focusing direction by a two-axis mechanism.

The optical pickup 51 is moved in a radial direction across the optical disk 1 by a sled mechanism 53.

The laser diode in the optical pickup 51, driven by a drive signal (drive current) from a laser driver 63, emits a laser beam.

As will be discussed later, a mechanism for correcting a spherical aberration of the laser light, included in the optical pickup 51, performs spherical aberration correction under the control of a system controller 60 and a servo circuit 61.

The light containing information reflected from the optical disk 1 is detected and converted into an electrical signal responsive to an amount of light by the photodetector. The electrical signal is then supplied to a matrix circuit 54.

The matrix circuit 54 includes a current-voltage converter circuit and a matrix calculation and amplification circuit working in response to currents output from a plurality of photoreceiving elements as the photodetector. The matrix circuit 54 performs a matrix calculation process, thereby generating required signals.

For example, the matrix circuit 54 generates a high-frequency signal corresponding to playback data (playback data signal or RF signal), a focus error signal for servo control, a tracking error signal, etc.

The matrix circuit 54 further generates a signal related to wobbling of the groove, namely, a push-pull signal for detecting a wobble (wobble amplitude).

The playback signal output from the matrix circuit 54 is supplied to a reader/writer (RW) circuit 55, the focus error signal and the tracking error signal are supplied to the servo circuit 61, and the push-pull signal is supplied to a wobble circuit 58.

The reader/writer circuit 55 performs a binarize process and a playback clock generation process using phase-lock loop (PLL) on the playback data (RF signal), thereby reproducing data read as a phase change mark, and supplying the read data to a modulator/demodulator 56.

In accordance with the present embodiment, the reader/writer circuit 55 includes an evaluator 55a for measuring a jitter value of the RF signal. The jitter value measured by the evaluator 55a is supplied to the system controller 60.

The modulator/demodulator 56 has a functional part as a decoder working during the playing operation and a functional part as an encoder working during the recording operation.

The modulator/demodulator 56 thus performs run-length limited decoding process in accordance with a playback clock during the playing operation.

An ECC encoder/decoder 57 performs an ECC encoding process for attaching an error correction code during the recording operation and an ECC decoding process for error correction during the playing operation.

During the playing operation, the ECC encoder/decoder 57 captures data decoded by the modulator/demodulator 56 onto an internal memory, and performs an error detection/correction process and a deinterleave process on the data to obtain playback data.

The data decoded by the ECC encoder/decoder 57 is read and transferred to an audio-visual (AV) system 120 in response to a command from the system controller 60.

The push-pull signal output from the matrix circuit 54 as the signal related to the wobble of the groove is processed by the wobble circuit 58. The wobble circuit 58 demodulates the push-pull signal as the ADIP information into a data stream constructing the ADIP address, and the data stream is then supplied to an address decoder 59.

The address decoder 59 decodes the supplied data into an address value, and supplies the address value to the system controller 60.

The address decoder 59 generates a clock in a PLL process using a wobble signal supplied from the wobble circuit 58, and then supplies the clock as an encoding clock for recording to each element.

During the recording operation, recording data is transferred from the AV system 120 to a memory (not shown) in the ECC encoder/decoder 57 for buffering.

The ECC encoder/decoder 57 performs an encode process on the buffered recording data, thereby adding an error correction code, interleave and subcode to the buffered recording data.

The modulator/demodulator 56 performs a predetermined run-length limited encoding process (modulation process) such as RLL(1-7) PP method on the ECC encoded data, and then supplies the encoded data to the reader/writer circuit 55.

During the recording operation, the clock generated from the wobble signal is used for the encoding clock serving as a reference clock for the encoding process.

The reader/writer circuit 55 performs a recording correction process on the recording data generated in the encoding process. More specifically, the reader/writer circuit 55 performs fine adjustment to an appropriate recording power and adjustment to a laser drive pulse waveform taking into consideration characteristics of a recording layer, a spot shape of a laser light beam, a recording linear velocity, etc. The reader/writer circuit 55 then supplies the adjusted recording data as a laser drive pulse to the laser driver 63.

The laser driver 63 supplies the supplied laser drive pulse to a laser diode in the optical pickup 51, thereby performing a laser emission driving operation. Pits (phase change marks) are thus created on the optical disk 1 in response to the recording data.

The laser driver 63, including an auto power control (APC) circuit, controls laser power to a constant level regardless of temperature change while monitoring the laser output power from an output from a detector monitoring the laser output power arranged in the optical pickup 51.

The system controller 60 supplies a target value of the laser output power during the recording and reproducing operations (recording laser power and reproducing laser power). During the recording and reproducing operations, the laser output power levels are controlled to the respective target levels.

To perform a servo operation, the servo circuit 61 generates a focus servo drive signal, a tracking servo drive signal, and a sled servo drive signal from the focus error signal and the tracking error signal from the matrix circuit 54.

More specifically, the servo circuit 61 generates the focus drive signal and the tracking drive signal in response to the focus error signal and the tracking error signal, respectively, thereby driving a focus coil and a tracking coil in a two-axis mechanism in the optical pickup 51. Each of a tracking servo loop and a focus servo loop is thus constructed of the optical pickup 51, the matrix circuit 54, the servo circuit 61 and the two-axis mechanism.

In response to a track jump command from the system controller 60, the servo circuit 61 turns off the tracking servo loop and outputs a jump drive signal, thereby performing a track jump operation.

The servo circuit 61 generates a sled drive signal in response to a sled error signal obtained as a low-frequency component of the tracking error signal, and under access control of the system controller 60, generates a sled drive signal, thereby driving the sled mechanism 53. The sled mechanism 53 includes a mechanism (not shown) including a main shaft supporting the optical pickup 51, a sled motor, transmission gears, etc., and drives the sled motor in response to the sled drive signal. The optical pickup 51 can thus perform a predetermined sliding operation.

The spindle circuit 62 controls a spindle motor 52 at a constant linear velocity (CLV).

The spindle circuit 62 acquires, as rotation speed information of the spindle motor 52, a clock generated in the PLL process performed on the wobble signal, and compares the rotation speed information with predetermined CLV reference speed information, thereby generating spindle error information.

During the data playback, a playback clock generated by the PLL in the reader/writer circuit 55 (clock serving as a reference in the decoding process) becomes the current rotation speed information of the spindle motor 52. The spindle error information can also be generated by comparing the playback clock with the predetermined CLV reference speed information.

The spindle circuit 62 outputs a spindle drive signal generated in response to the spindle error information, thereby causing the spindle motor 52 to rotate at the CLV.

The spindle circuit 62 generates the spindle drive signal in response to a spindle kick/brake control signal from the system controller 60, thereby causing the spindle motor 52 to start, stop, accelerate, and decelerate.

The above-described operations of the servo system and the recording and playback system are controlled by the system controller 60 including a microcomputer.

The system controller 60 performs a variety of processes in response to commands from the AV system 120. For example, in response to a write command from the AV system 120, the system controller 60 moves the optical pickup 51 to an address to write. The ECC encoder/decoder 57 causes the modulator/demodulator 56 to perform the above-described encoding process on the data transferred from the AV system 120 (including video data and audio data of one of a variety of schemes such as MPEG 2). The laser drive pulse from the reader/writer circuit 55 is then supplied to the laser driver 63 to record the recording data onto the optical disk 1.

When the AV system 120 issues a read command requesting the transfer of given data recorded on the optical disk 1 (for example, video data of MPEG 2), a seek operation control process is first performed to an indicated address. More specifically, the command is issued to the servo circuit 61 to cause the optical pickup 51 to access the address specified by a seek command.

An operation required to transfer the data in a specified data period to the AV system 120 is performed. More specifically, data is read from the optical disk 1, and a decoding and buffering process is performed on the read data using the reader/writer circuit 55, the modulator/demodulator 56, and the ECC encoder/decoder 57. The requested data is then transferred.

With the phase change mark used during the recording and playback operations, the system controller 60 controls access and recording and playback operations using the ADIP address detected by the wobble circuit 58 and the address decoder 59.

As shown in FIG. 1, the recording and reproducing apparatus is connected to the AV system 120. The recording apparatus of one embodiment of the present invention may be connected to a personal computer instead of the AV system 120.

The recording apparatus of one embodiment of the present invention may not be connected to another apparatus. In such a case, the configuration of data input and output interfaces may be different from the configuration of FIG. 1. More specifically, data input and output terminals are arranged and the recording and playback operations may be performed in response to user operation inputs.

Figures 2, 4A:
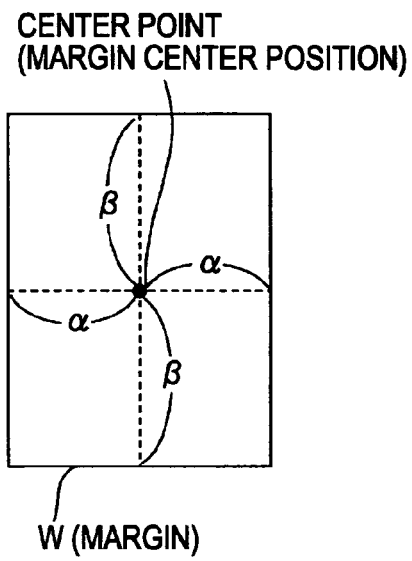

FIG. 2 illustrates an example of a spherical aberration correction mechanism in an optical system in the optical pickup 51.

As shown in FIG. 2, a laser light beam output from a semiconductor laser diode 81 is collimated by a collimator lens 82. The collimated laser beam is passed through a beam splitter 83, then passed through a movable lens 87 and a fixed lens 88 as a spherical aberration correction lens group, and then directed to the optical disk 1 via an objective lens 84. The spherical aberration correction lens group 83 and 88 are referred to as an expander. Since the spherical aberration correction is performed by driving the movable lens 87, the movable lens 87 is also referred to as an expander 87.

The light reflected from the optical disk 1 is passed through the objective lens 84, the fixed lens 88, and the movable lens 87, reflected by the beam splitter 83, and incident on a detector 86 via a collimator lens (light collecting lens 85).

In the optical system, the objective lens 84 is supported by a two-axis mechanism 91 in a manner movable in a focus direction and in a tracking direction, thereby performing the focus servo operation and the tracking servo operation.

The spherical aberration correction lenses 87 and 88 have a function of defocusing a wave front of the laser light. More specifically, the movable lens 87 is supported by an actuator 90 in a manner movable in a J direction as an optical direction. With the movable lens 87 moved, an object point of the objective lens 84 is adjusted.

More specifically, the spherical aberration is corrected by causing the actuator 90 to perform a back and forth movement.

As shown in FIG. 2, the spherical aberration correction is performed using the expander. The spherical aberration may also be corrected using a liquid-crystal panel.

A liquid-crystal panel is arranged in an optical path between the semiconductor laser 81 and the objective lens 84. A boundary between an area where the laser light is passed and an area where the laser light is blocked is movably adjusted to vary a diameter of a laser light beam to correct the spherical aberration.

In this case, a liquid-crystal driver for driving the liquid-crystal panel is controlled to vary a light passing area.

Figure 3:
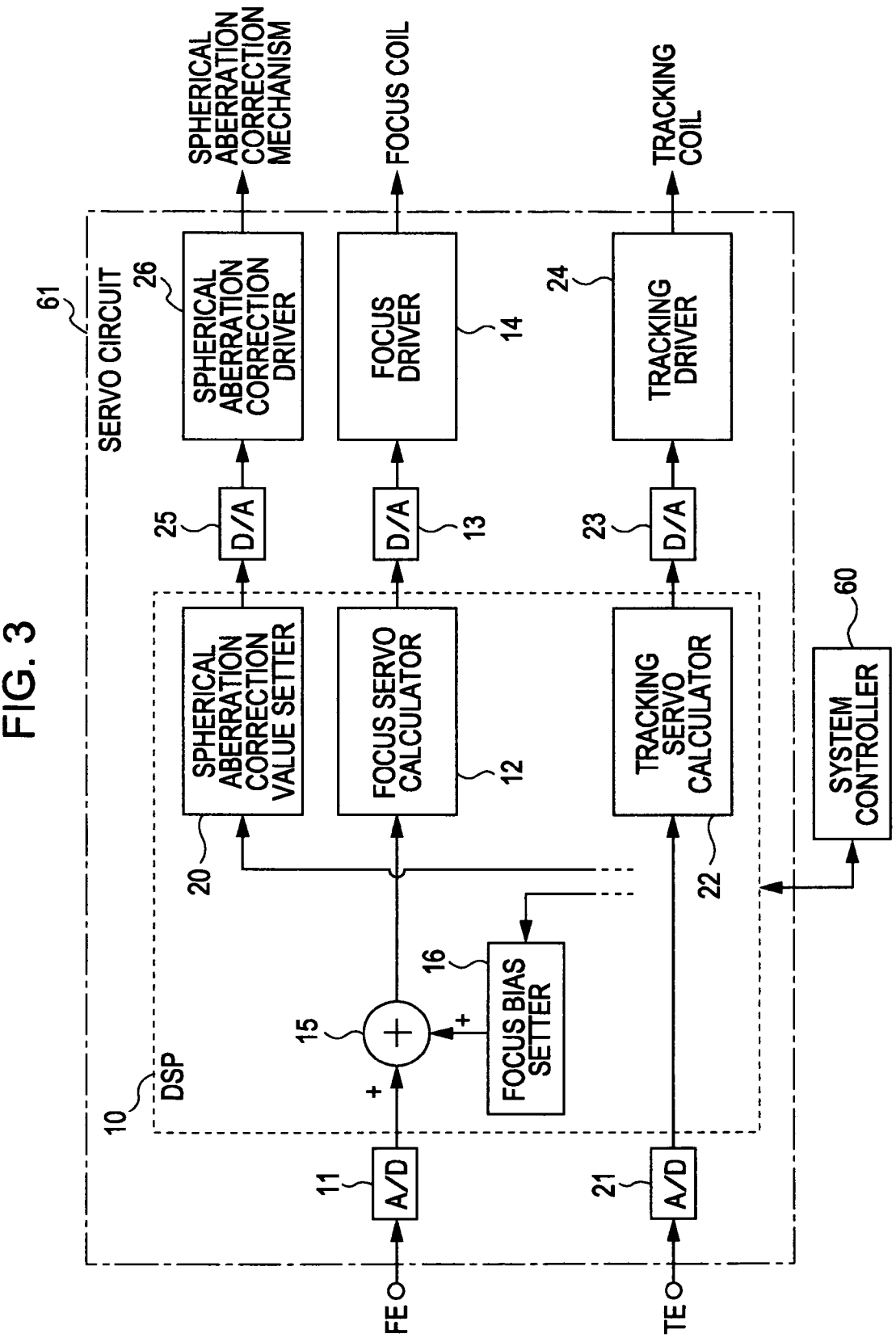
FIG. 3 is a block diagram of a servo circuit in the reproducing apparatus in accordance with one embodiment of the present invention.

FIG. 3 illustrates an internal structure of the servo circuit 61 of FIG. 1.

As shown in FIG. 3, the focus error signal FE and the tracking error signal TE from the matrix circuit 54 of FIG. 1 are converted into digital data by analog-to-digital (A/D) converters 11 and 12 and then input to a digital signal processor (DSP) 10 in the servo circuit 61.

The DSP 10 includes a focus servo calculator 12 and a tracking servo calculator 22 as shown in FIG. 3.

The focus error signal FE from the A/D converter 11 is input to the focus servo calculator 12 via an adder 15 in the DSP 10.

The focus servo calculator 12 performs a filtering process and a loop gain process on the focus error signal FE input as digital data for phase correction, thereby generating and outputting a focus servo signal. The focus servo signal is converted into an analog signal by a digital-to-analog (D/A) converter 13 (also subjected to one of PWM and PDM processes) and input to a focus driver 14 to drive a focus actuator. More specifically, a current is applied to the focus coil of the two-axis mechanism 91 supporting the objective lens 84 in the optical pickup 51 to perform a focus servo operation.

The tracking servo calculator 22 performs a filtering process and a loop gain process on the tracking error signal TE input as digital data for phase correction, thereby generating and outputting a tracking servo signal. The tracking servo signal is converted into an analog signal by a D/A converter 23 (also subjected to one of PWM and PDM processes), and input to a tracking driver 24 to drive a tracking actuator. More specifically, a current is applied to the tracking coil of the two-axis mechanism 91 supporting the objective lens 84 in the optical pickup 51 to perform a tracking servo operation.

The DSP 10 includes functional units for performing focus bias addition, spherical aberration correction value setting, and adjustment of the focus bias value and the spherical aberration correction value.

The adder 15 adds a focus bias to the focus error signal FE. The focus bias value to be added is set in the focus bias setter 16. In an adjustment process to be discussed later, the focus bias setter 16 outputs the focus bias value set by the system controller 60 of FIG. 1, thereby adding an appropriate focus bias to the focus bias loop.

The system controller 60 sets a spherical aberration correction value in the spherical aberration correction value setter 20. The set spherical aberration correction value is converted into an analog signal by a D/A converter 25, and then supplied to a spherical aberration correction driver 26.

In the case of the spherical aberration correction mechanism of FIG. 2, the spherical aberration correction driver 26 supplies a drive signal Sd to the actuator 90 for moving the expander 87. In the case of the spherical aberration correction mechanism employing the liquid-crystal panel, the spherical aberration correction driver 26 supplies to the liquid-crystal driver a signal Sd specifying a voltage application to a predetermined cell in the liquid-crystal panel.

The spherical aberration correction driver 26 drives the spherical aberration correction mechanism in the optical pickup 51 in response to the spherical aberration correction value supplied from the spherical aberration correction value setter 20.

The focus servo calculator 12 and the tracking servo calculator 22 constructed in the DSP 10 and the control operation for adjusting the focus bias value and the spherical aberration correction value are controlled by the system controller 60.

The adjustment of the focus bias value and the spherical aberration correction value to be controlled by the system controller 60 will be described later.

In accordance with one embodiment of the present invention, the recording and reproducing apparatus discussed with reference to FIGS. 1 through 3 adjusts the focus bias value and the spherical aberration correction value to optimum values at the margin center position.

As previously discussed with reference to FIGS. 18 and 19, the margin center position refers to a position from which the largest margin is permitted against the temperature change and the flatness non-uniformity of the optical disk 1 after the adjustment of the focus bias value and the spherical aberration correction value. More specifically, with the spherical aberration correction value and the focus bias value adjusted to the margin center position, the signal recording and reproducing operation quality is maintained to within an assumed range in response to deviation in the spherical aberration and focus after the adjustment.

The previously discussed known method of adjusting the spherical aberration correction value and the focus bias value is performed to a spherical aberration correction value and a focus bias value providing the best value of the evaluation signal based on the concept of the required margin.

The spherical aberration correction value and the focus bias value are adjusted to a point providing the best value of the evaluation signal. If the contour line of the evaluation signal value extends in a regular ellipse in the spherical aberration correction value direction and the focus bias value direction, the adjustment point becomes equivalent to the margin center, and a good recording and reproducing operation quality can be maintained against the deviation in the focus and the spherical aberration due to the temperature change and the flatness non-uniformity. More specifically, if the contour line is a regular ellipse, the best point of the evaluation value, namely, the center of the contour line becomes an optimum point.

Figure 18:
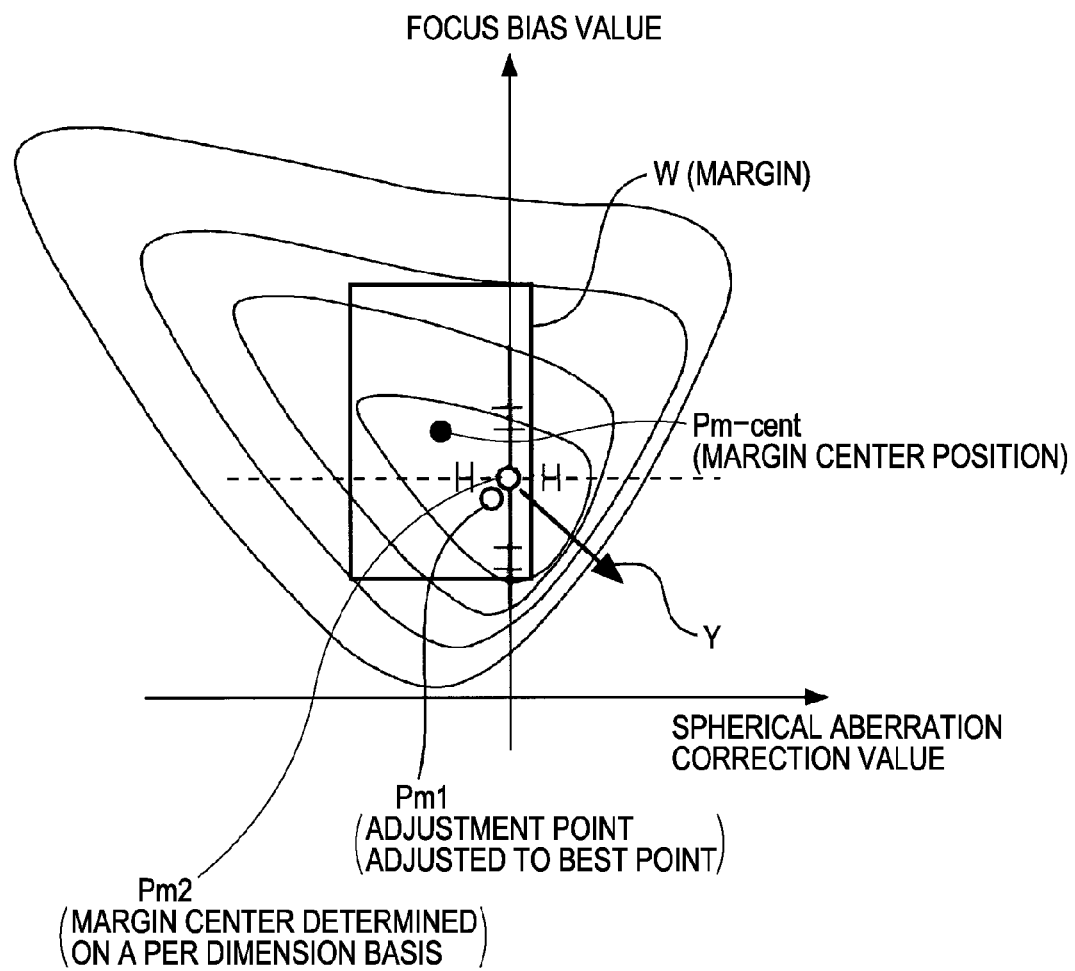
FIG. 18 illustrates, in a known art, two-dimensional contour lines representing characteristics of jitter values of an evaluation signal with the spherical aberration correction value plotted in the abscissa plotted in the ordinate.
Figure 19:
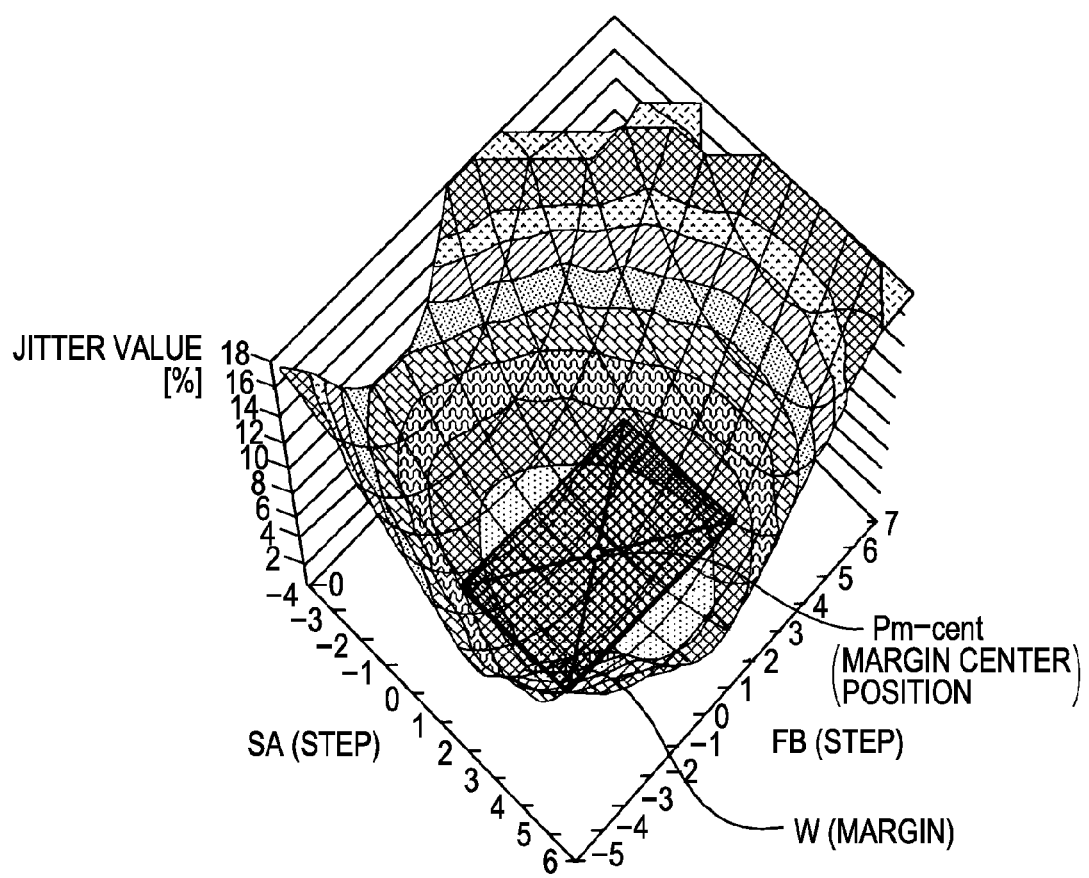
FIG. 19 illustrates, in the known art, three-dimensional contour lines representing characteristics of jitter values of an evaluation signal with the spherical aberration correction value plotted in the abscissa plotted in the ordinate.

If the contour line of the evaluation characteristics is deformed as shown in FIG. 18, the known method of adjusting to the contour of the contour line fails to achieve a sufficient margin against the deviation in the focus and the spherical aberration after the adjustment.

As shown in FIG. 18, if the adjustment to the center of the contour line is performed, the adjustment point becomes Pm1, for example. If shifting takes place in the Y direction in which spacing between the contour lines is narrowed, with the adjustment performed to the point Pm1, the apparatus suffers from a sharp degraded characteristic. A sufficient signal recording and reproducing operation quality cannot be assured against the temperature change and the flatness non-uniformity.

In another method of adjusting to the margin center, each of the spherical aberration correction value and the focus bias value is adjusted in the spherical aberration correction value direction and the focus bias value direction on a dimension by dimension basis.

As shown in FIG. 18, in each of the spherical aberration correction value direction and the focus bias value direction, the adjustment is performed to the value taking into consideration the margin responsive to the temperature change and the flatness non-uniformity (as shown by the adjustment point Pm2).

Even with this technique, the adjustment cannot be performed to the center of the margin W if the contour line of the evaluation value characteristics is deformed as shown in FIG. 18. Characteristics sharply are degraded in the Y direction, and no sufficient signal recording and reproducing operation quality can be assured against the temperature change and the flatness non-uniformity.

The contour lines of the evaluation characteristics are particularly deformed when an optical pickup having an aberration is used or when an error value or a deviation value from an ideal value is used as an evaluation value with a partial response maximum likelihood (PRML) decoding used to binarize a playback signal. In such a case, the problem is worsened.

It is thus desirable to make adjustments to the margin center when an optical pickup having an aberration is used or when an error value or a deviation value from an ideal value is used as an evaluation value with a partial response maximum likelihood (PRML) decoding used to binarize a playback signal.

In accordance with one embodiment of the present invention, the spherical aberration correction value and the focus bias value are adjusted to the margin center position using the following technique.

Figure 4B:
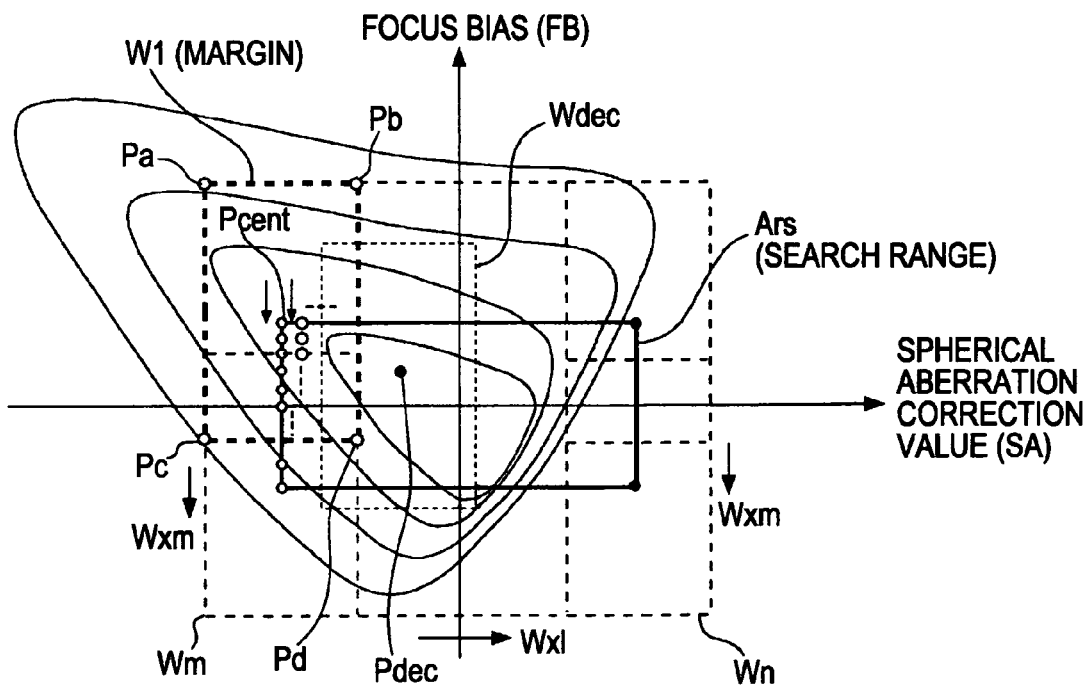

FIGS. 4A-1 and 4A-2 and 4B illustrate a basic technique of adjusting the spherical aberration correction value and the focus bias value in accordance with one embodiment of the present invention. FIGS. 4A-1 and 4A-2 illustrate an assumed margin, and FIG. 4B illustrates contour lines of jitter characteristics with the spherical aberration correction value plotted in the abscissa and the focus bias value plotted in the ordinate.

As shown in FIGS. 4A-1 and 4A-2, an assumed margin W is defined before adjustment taking into consideration a required margin.

As the assumed margin W of FIG. 18, the assumed margin W is defined by a range within which the focus and the spherical aberration can shift from the center point after the adjustment. The assumed margin W and the margin W are identical in shape and area.

The assumed margin W and the margin W having the same shape and the same area are designated with the same H reference symbols.

As shown, the margin W has two sides, each having a length of $2\alpha$ ($\alpha+\alpha$) in the spherical aberration correction value direction, and the other two sides, each having a length of 2β (β+β). The assumed margin W also has two sides, each having a length of 2α (α+α) in the spherical aberration correction value direction, and the other two sides, each having a length of 2β (β+β).

If coordinates (the spherical aberration correction value, the focus bias value) are provided as a center point in the assumed margin W, all coordinates (the spherical aberration correction values, the focus bias values) within the assumed margin W are identified. For example, if the center point of the assumed margin is (1,1), coordinates of the four corner points of the assumed margin W are respectively (1+α, 1+β), (1−α, 1+β), (1−α, 1−β), and (1+α, 1−β).

In accordance with one embodiment of the present invention, the assumed margin W thus defined is shifted as shown in FIG. 4B with the center point Pcent moved to within a predetermined search area Ars. At each shift point, a jitter value is measured at each point on the outline of the assumed margin W (the four corner points Pa through Pd as shown in FIG. 4B) and the maximum value (worst value) of the jitter values is set as a representative point. One of the representative values thus obtained providing a jitter value equal to or better than a predetermined amount level, namely, one representative value having the jitter value lower than a predetermined value, is identified. The spherical aberration correction value and the focus bias value are adjusted based on the spherical aberration correction value and the focus bias value at the center point of the assumed margin W resulting in that representative value.

For simplicity of explanation, the representative value providing the lowest (best) jitter value is identified, and the spherical aberration correction value and the focus bias value at the center point (center point Pdec of Wdec of FIG. 4B) of the assumed margin W corresponding to the obtained representative value are set.

More specifically, as shown in FIG. 4B, the search area Ars extends by a value m in the focus bias value direction, and a value l in the spherical aberration correction value direction, covering an area of m×l and thus includes n shift points (m×l=n) therewithin. The center point Pcent of the assumed margin W is shifted by shifting one row of the spherical aberration correction values by the value m in the focus bias value direction and this movement of one row of the spherical aberration correction values is performed to l-th row. The shift range of the assumed margin W thus covers W1 through Wn.

When the assumed margin W is shifted to W1 to Wn, the jitter value is measured at each of the outline points of the assumed margin W (Pa-Pd) with respect to each shift point, and the maximum value (worst value) among the jitter values at Pa-Pd is set as a representative value at the shift point.

The assumed margin W providing the representative value having the minimum value (best value) of the jitter values from among the representative values of the shift points is identified. The spherical aberration correction value and the focus bias value at the center point of the assumed margin W are set for adjustment.

The assumed margin w providing the best representative value from among the assumed margins W shifted to a plurality of positions within the predetermined range is found to be closest to the optimum margin W. By adjusting the spherical aberration correction value and the focus bias value to the center point of the assumed margin W providing the best representative value (position of Wdec as shown), the spherical aberration correction value and the focus bias value can be adjusted to the margin center Pm-cent.

In accordance with the technique of the present embodiment, the assumed margin W is defined to have the same shape and area as the margin, and the assumed margin W is two-dimensionally shifted to be fitted with the margin. The two-dimensional fitting, which is different from the known method of simply adjusting to the center of the contour line and the known method of adjusting to the center position on a dimension by dimension basis, reliably performs the adjustment to the margin center even if the contour line of the evaluation signal values is deformed.

In accordance with the embodiment of the present invention, the spherical aberration correction value and the focus bias value are adjusted to the margin center position Pm-cent even when the contour line of the value of the evaluation signal is deformed.

More specifically, even when an optical pickup having an aberration is used or even when an error value or a deviation value from an ideal value is used as an evaluation value with a partial response maximum likelihood (PRML) decoding used to binarize a playback signal, the spherical aberration correction value and the focus bias value can be adjusted to the margin center position Pm-cent.

With the spherical aberration correction value and the focus bias value adjusted to the margin center position Pm-cent, the recording and reproducing operation quality is maintained to within an assumed range even when a change occurs in the focus and the spherical aberration due to the temperature change or the disk surface non-uniformity.

From the above discussion, the search area Ars shown in FIG. 4B is a range that is to be set with the margin center position Pm-cent contained therewithin.

An approximate position of the margin center position Pm-cent can be determined by examining the contour line of the characteristics of jitter value (value of the evaluation signal) determined beforehand when the spherical aberration correction value and the focus bias value are changed in the recording and reproducing apparatus. From information regarding the approximate margin center position Pm-cent, the search area Ars may be defined to be a relatively wide area to allow the margin center position Pm-cent to be contained therewithin With respect to each shift point, the jitter value is measured at each of the plurality of points along the outline of the assumed margin W. The worst value may not be obtained along the outline depending on the contour line of the jitter characteristics. In such a case, the measurement points of the jitter value are not limited to the outline of the assumed margin W. The jitter value may be measured at another point within the assumed margin W.

In accordance with the basic concept of adjusting the spherical aberration correction value and the focus bias value discussed with reference to FIGS. 4A1-1, 4A-2 and 4B, the adjustment is performed to the margin center position Pm-cent even when the contour line of the evaluation value is deformed.

If the technique described with reference to FIG. 4B is actually practiced, the spherical aberration correction value and the focus bias value needs to be adjusted at a large number of points, and adjustment time is prolonged.

More specifically, if the technique described with reference to FIG. 4B is actually practiced, the jitter value needs to be measured at the four points Pa-Pd, and the spherical aberration correction value and the focus bias value need to be set four times at each shift point. Since the measurement of FIG. 4B is performed by n times, the setting of the spherical aberration correction value and the focus bias value and measurement of the jitter value at these points need to be repeated by a large number of times.

The setting of the spherical aberration correction value involves the driving of the expander 87 as previously discussed with reference to FIG. 2, thereby requiring a relatively long time. The repetition of these operations is not preferable from the standpoint of short adjustment time.

A first embodiment of the present invention relates to a technique that shortens adjustment time in the adjustment to the margin center position Pm-cent even when the contour line of the evaluation values is deformed.

Figure 5:
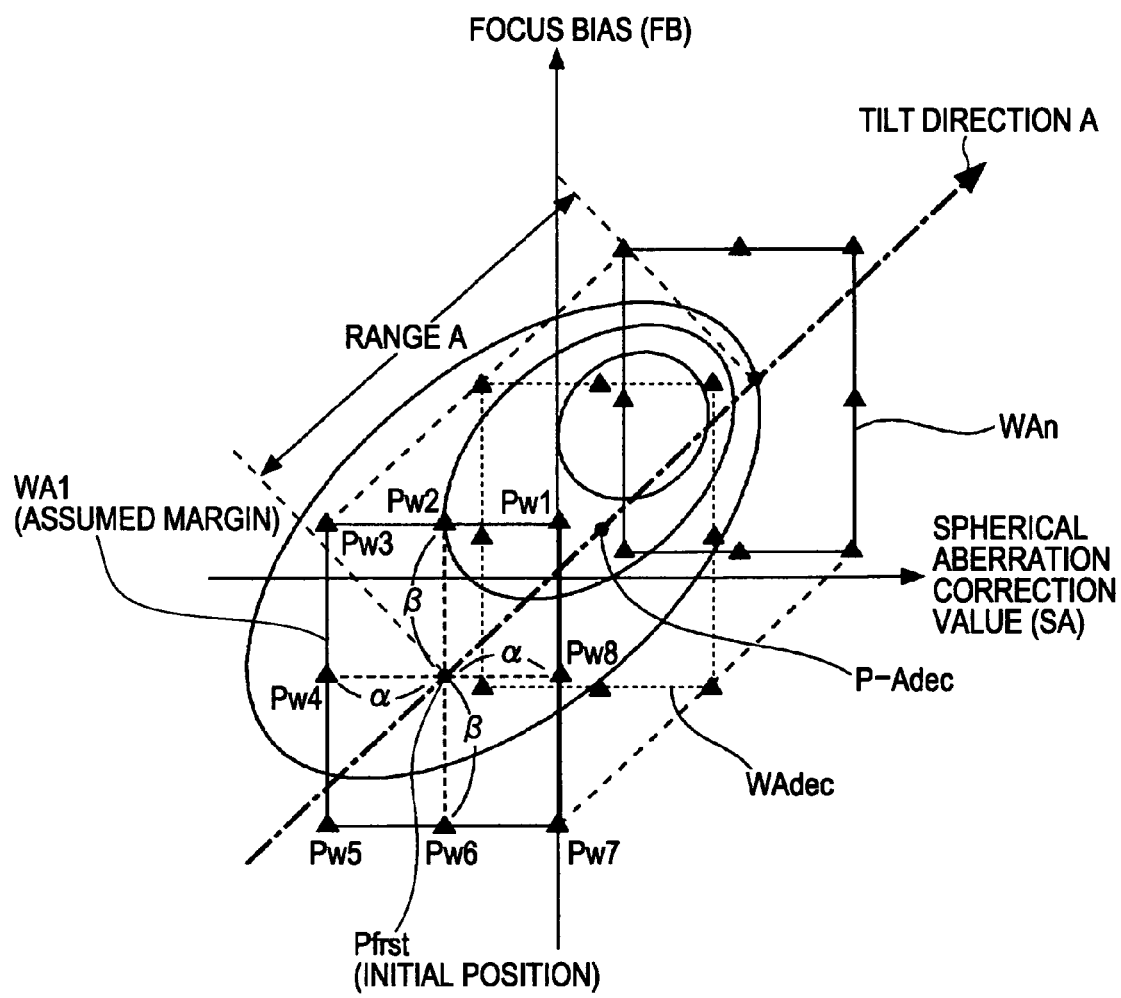
FIG. 5 illustrates an adjustment operation of the spherical aberration correction value in accordance with a first embodiment of the present invention.
Figure 6:
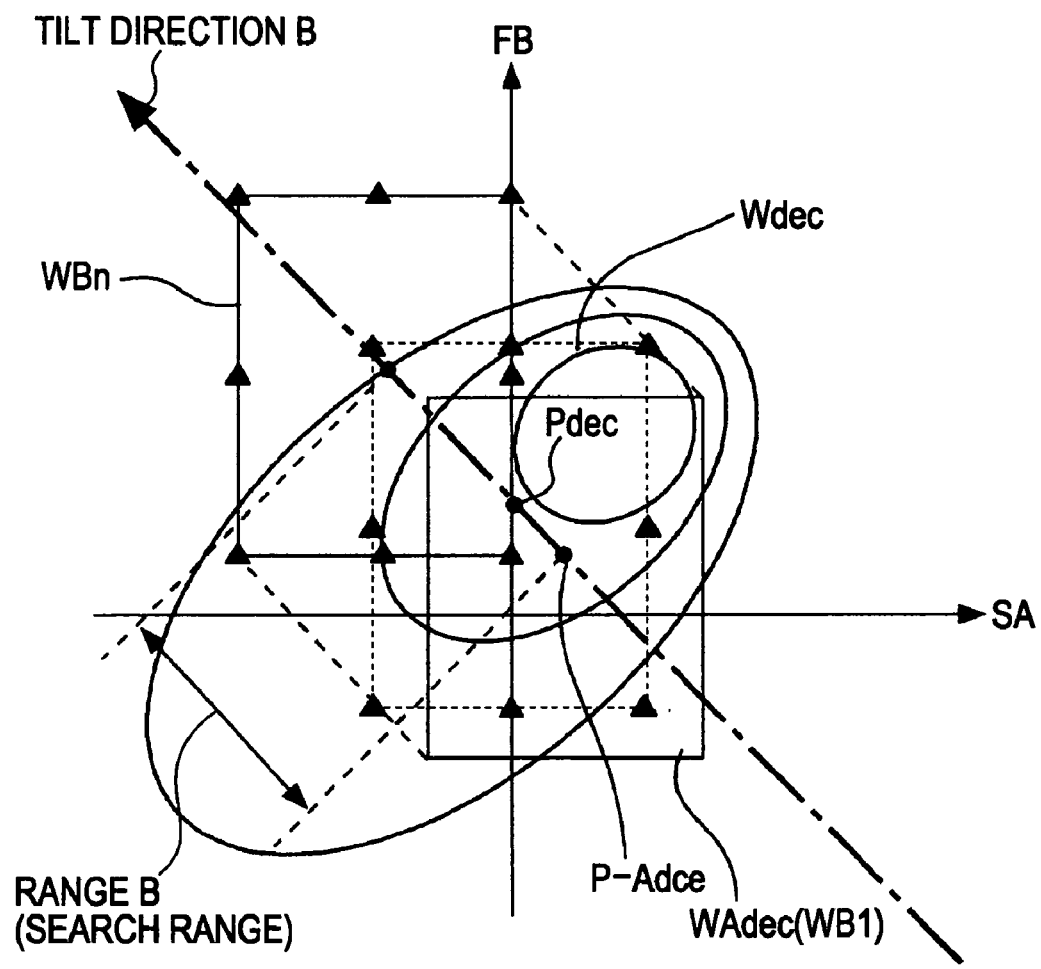
FIG. 6 illustrates an adjustment operation of the spherical aberration correction value in accordance with the first embodiment of the present invention.

FIGS. 5 and 6 illustrate an adjustment technique in accordance with the first embodiment of the present invention, namely, illustrate the contour lines of the jitter characteristics with the spherical aberration correction value plotted in the abscissa and the focus bias value plotted in the ordinate.

In accordance with the technique of the first embodiment of the present invention, the assumed margin W is shifted with the center point thereof shifted in a predetermined tilt direction A within a predetermined range (range A) as shown in FIG. 5. The representative value at each shift point is stored, and the assumed margin W (WAdec as shown) providing the minimum representative value from among the representative values of the shift points is identified.

The center point of the assumed margin W identified as providing the minimum representative value is set to be a starting point. The assumed margin W is shifted with the center point thereof shifted in a predetermined tilt direction B within a predetermined range (range B) as shown in FIG. 6. The representative value at each shift point is stored. The assumed margin W (WBdec as shown) providing the minimum representative value from among the representative values of the shift points is identified. The spherical aberration correction value and the focus bias value are set to the center point (Pdec) of the identified assumed margin W.

The initial point Pfrst of FIG. 5 is a point at which the tracking servo operation is effective after the optical disk 1 is loaded, or a point at which the spherical aberration correction value and the focus bias value are set as an initial value recorded on the optical disk 1. More specifically, subsequent to the start of the adjustment, the spherical aberration correction value and the focus bias value are set at the initial position Pfrst. The assumed margin W is thus shifted with the center point thereof shifted from the initial position Pfrst by the range A in the tilt direction A.

The tilt direction A of FIG. 5 is defined as a direction in which the ellipse formed of the contour lines of the jitter value characteristics is generally expanded.

The tilt direction B of FIG. 6 is defined as a direction in which the ellipse formed of the contour lines of the jitter value characteristic is shrunk.

The direction in which the ellipse formed of the contour lines of the jitter value characteristics is expanded and the direction in which the ellipse of the contour lines formed of the jitter value characteristic is shrunk are determined by examining the jitter value characteristics by varying beforehand the spherical aberration correction value and the focus bias value in the recording and reproducing apparatus. The tilt direction A and the tilt direction B can be set based on the directions determined beforehand from the jitter value characteristics.

The range A in the tilt direction A is defined by a predetermined range extending in the tilt direction A from the initial position Pfrst as a starting point.

The center point is shifted within the range A and the representative value is obtained at each shift point. A assumed margin W providing the minimum representative value is then identified. The range A is a range that is set up beforehand so that the center point providing the minimum representative value is arranged in the range in the tilt direction A.

An approximate position of the initial position Pfrst and an approximate position of the center point providing the minimum representative value with the assumed margin W shifted from the initial position Pfrst in the tilt direction A are determined by examining beforehand the jitter value characteristics of the recording and reproducing apparatus. More specifically, the range A is determined based on the approximate position of the initial position Pfrst determined from the jitter value characteristics and the approximate position of the center point providing the minimum representative value with the assumed margin W shifted from the initial position Pfrst in the tilt direction A. The range A is thus determined based on the range that is identified to contain the center point providing the minimum representative value.

For example, the jitter value characteristics responsive to the spherical aberration correction value and the focus bias value are plotted in FIG. 5. If the approximate position of the initial position Pfrst is identified, the movement of the assumed margin W is simulated when the assumed margin W is shifted with the center point thereof shifted from the initial position Pfrst in the tilt direction A. The simulation results show how much range the center point from the initial position Pfrst in the tilt direction A needs to be shifted in order that the range contains the center point providing the minimum representative value. As a result, the range A is determined.

The range B of FIG. 6 is a range which contains the margin center position Pm-cent. As the range A, the range B can be determined from simulation results performed using the jitter value characteristics. More specifically, if the jitter value characteristics are obtained, the approximate position of the margin center position Pm-cent can be known. The center point (P-Adec) determined in the process of FIG. 5 is also approximately known. An approximate distance between the margin center position Pm-cent and the center point P-Adec is determined. The range B is determined from the distance.

The jitter value characteristics responsive to the spherical aberration correction value and the focus bias value remain approximately equal among the recording and reproducing apparatuses if each apparatus has the same optical system (on the premise that the optical disk 1 of the same media type is used). The range A and the range B are thus commonly set among the recording and reproducing apparatuses. In other words, the range A and the range B are different from apparatus to apparatus if each apparatus has different optical system.

In view of the above discussion, the adjustment method of the first embodiment of the present invention is specifically described below.

As shown in FIG. 5, a total of eight points, namely, four corner points along the outline of the assumed margin W (Pw1, Pw3, Pw5, and Pw7) and intermediate points between any two adjacent corner points (Pw2, Pw4, Pw6, and Pw8) are set as jitter measurement points along the outline of the assumed margin W. The jitter values are measured at the eight points along the outline with respect to each shift point, and the representative value (the maximum value, namely, the worst value) is determined for each shift point.

The recording and reproducing apparatus determines the spherical aberration correction value and the focus bias value at each measurement point in an assumed margin WA1 based on the setting values of the spherical aberration correction value and the focus bias value at the initial position Pfrst. Let (SAfrst, FBfrst) represent (spherical aberration correction value, focus bias value) at the initial position Pfrst, and (spherical aberration correction value, focus bias value) at the measurement point Pw1 is determined from (SAfrst+α, FBfrst+β). Also, (spherical aberration correction value, focus bias value) at the measurement point Pw4 is determined from (SAfrst−α, FBfrst).

The spherical aberration correction values and the focus bias values at the measurement points Pw1-Pw8 thus measured are successively respectively set to the spherical aberration correction value setter 20 and the focus bias setter 16 (see FIG. 3), and the jitter values are obtained with these spherical aberration correction values and the focus bias values set. The maximum jitter value is identified from among the jitter values thus obtained and is then stored. The worst value, namely, the representative value of the jitter values at the measurement points Pw1-Pw8 are thus stored.

Once the representative value at one shift point is stored, the assumed margin W is shifted with the center point thereof shifted in the tilt direction A.

The shifting of the assumed margin W in the tilt direction A is performed in steps of 1 in the spherical aberration correction value direction. More specifically, if the tilt direction A is "1", the center point and each measurement point Pw are shifted by +1 step in the spherical aberration correction value direction and by +1 step in the focus bias value direction. If the tilt direction A is "2," the center point and each measurement point are shifted by +1 step in the spherical aberration correction value direction and by +2 step in the focus bias value direction.

Subsequent to the shifting in the tilt direction A, the spherical aberration correction value and the focus bias value are determined at the center point determined from the value of the tilt direction A. Based on the values at the center point subsequent to the shift, the spherical aberration correction values and the focus bias values are calculated at the measurement points Pw1-Pw8 of the assumed margin W using α and β. The spherical aberration correction values and the focus bias values at the measurement points Pw1-Pw8 are successively set to the spherical aberration correction value setter 20 and the focus bias setter 16, respectively. The jitter values are then measured with these spherical aberration correction values and the focus bias values set. The maximum jitter value is identified from among the obtained jitter values, and then stored. The worst value, namely, the representative value of the jitter values at the measurement points Pw1-Pw8 is then stored.

The above-described operation is repeated until the center point reaches an end point of the range A (namely, the position of the assumed margin WAn). The representative value at each shift point is thus obtained by shifting the assumed margin W with the center point thereof shifted within the range A.

The center point of the assumed margin W providing the representative value having the minimum jitter value (the best jitter value) is identified from among the representative values at the shift points. As shown in FIG. 5, the position of the assumed margin W providing the minimum representative value is the position of the assumed margin WAdec, and the center point P-Adec is thus identified from the assumed margin WAdec.

After the center point of the assumed margin W providing the minimum representative value is searched in the tilt direction A, the same search process is performed in the tilt direction B as shown in FIG. 6. More specifically, the assumed margin W is shifted with the center point thereof shifted within the range B from the center point P-Adec of the assumed margin WAdec providing the minimum representative value as a starting point to the assumed margin WBn. The rest of the process is identical the process discussed with reference to FIG. 5. The representative value of each shift point of the assumed margin W is stored, and the center point of the assumed margin W providing the minimum representative value from among the shift points is identified.

As shown in FIG. 6, the assumed margin W providing the minimum representative value is an assumed margin Wdec, and the center point Pdec is thus identified.

When the center point Pdec of the assumed margin W providing the minimum representative value is identified in the searching in the tilt direction B, the spherical aberration correction value and the focus bias value are set to the center point Pdec.

The adjustment process of the first embodiment of the present invention is performed in the series of steps described with reference to FIG. 5 through the series of steps described with reference to FIG. 6. The spherical aberration correction value and the focus bias value are adjusted to the margin center position Pm-cent.

In accordance with the technique of the first embodiment of the present invention, the tilt direction A (in which the contour lines are distorted to expand the ellipse) and the tilt direction B (in which the contour lines are distorted to shrink the ellipse) are defined. The center point is thus shifted in each of the tilt direction A and the tilt direction B to identify the assumed margin W providing the minimum representative value. The center point of the optimum required margin (margin center position Pm-cent) is handled as a point on a two-dimensional plane defined by the tilt direction A (axis A) and the tilt direction B (axis B).

The position of the center point P-Adec of the assumed margin W shifted in the A direction and providing the minimum representative value, identified in the process of FIG. 5, indicates the position of the margin center position Pm-cent in the A axis direction. Through this process, the position of the margin center position Pm-cent in the A axis is identified.

Through the process of FIG. 6, the position of the center point providing the minimum representative value is searched in the B axis direction with the position of the margin center position Pm-cent in the A axis direction fixed. The position of the margin center position Pm-cent in the B axis direction is identified. The margin center position Pm-cent is thus identified.

The technique of the first embodiment is also based on the basic concept of FIG. 4. The fitting process of fitting to a two-dimensionally appropriate assumed margin is equally performed by shifting the assumed margin W. Even if the contour line is deformed, the adjustment of the spherical aberration correction value and the focus bias value is performed to the appropriate margin center position.

In accordance with the technique of the first embodiment of the present invention, different from the technique of fully searching the search area Ars in the plane of FIG. 4B, the adjustment to the margin center position Pm-cent is simply performed by searching in the predetermined ranges in two straight lines of the tilt direction A and the tilt direction B. Because of this feature, adjustment time is shorter than with the technique of FIG. 4B.

In accordance with the technique of the first embodiment of the present invention, without first searching the center point of the assumed margin W providing the minimum representative value in the A axis direction, the position of the margin center position Pm-cent in the B axis direction cannot be identified and the appropriate search range for searching the final margin center position Pm-cent in the B axis direction cannot be identified.

In other words, the operation of identifying the assumed margin W providing the minimum representative value in the A axis direction and the center point thereof as shown in FIG. 5 is performed to identify the appropriate search range to search for the final margin center position Pm-cent in the B axis direction as shown in FIG. 6.

In the above discussion, the center point of the assumed margin providing the minimum representative value is identified in the tilt direction A (in which the contour line is distorted to expand the ellipse) and then the center point of the assumed margin providing the minimum representative value is identified starting with the identified center point as a start point in the tilt direction B (in which the contour line is distorted to shrink the ellipse). The margin center position Pm-cent is thus identified. Conversely, the center point of the assumed margin providing the minimum representative value is first identified with respect to the initial position Pfrst in the tilt direction B and then the assumed margin providing the minimum representative value and the center point thereof are identified with respect to the identified center point in the tilt direction A. The margin center position Pm-cent is thus identified.

In this chase, the searching in the tilt direction B is a required search operation to identify the final search range in the tilt direction A to identify the margin center position Pm-cent.

With reference to a flowchart of FIG. 7, the adjustment process of the first embodiment of the present invention is described below.

The system controller 60 of FIGS. 1 and 3 performs the adjustment process under the control of a program stored on a random-access memory (ROM) or the like housed therewithin.

The adjustment process is performed on the premise that the optical disk 1 is loaded on the recording and reproducing apparatus and that the spherical aberration correction value and the focus bias value are set to those at the initial position Pfrst discussed with reference to FIG. 5.

Figure 7:
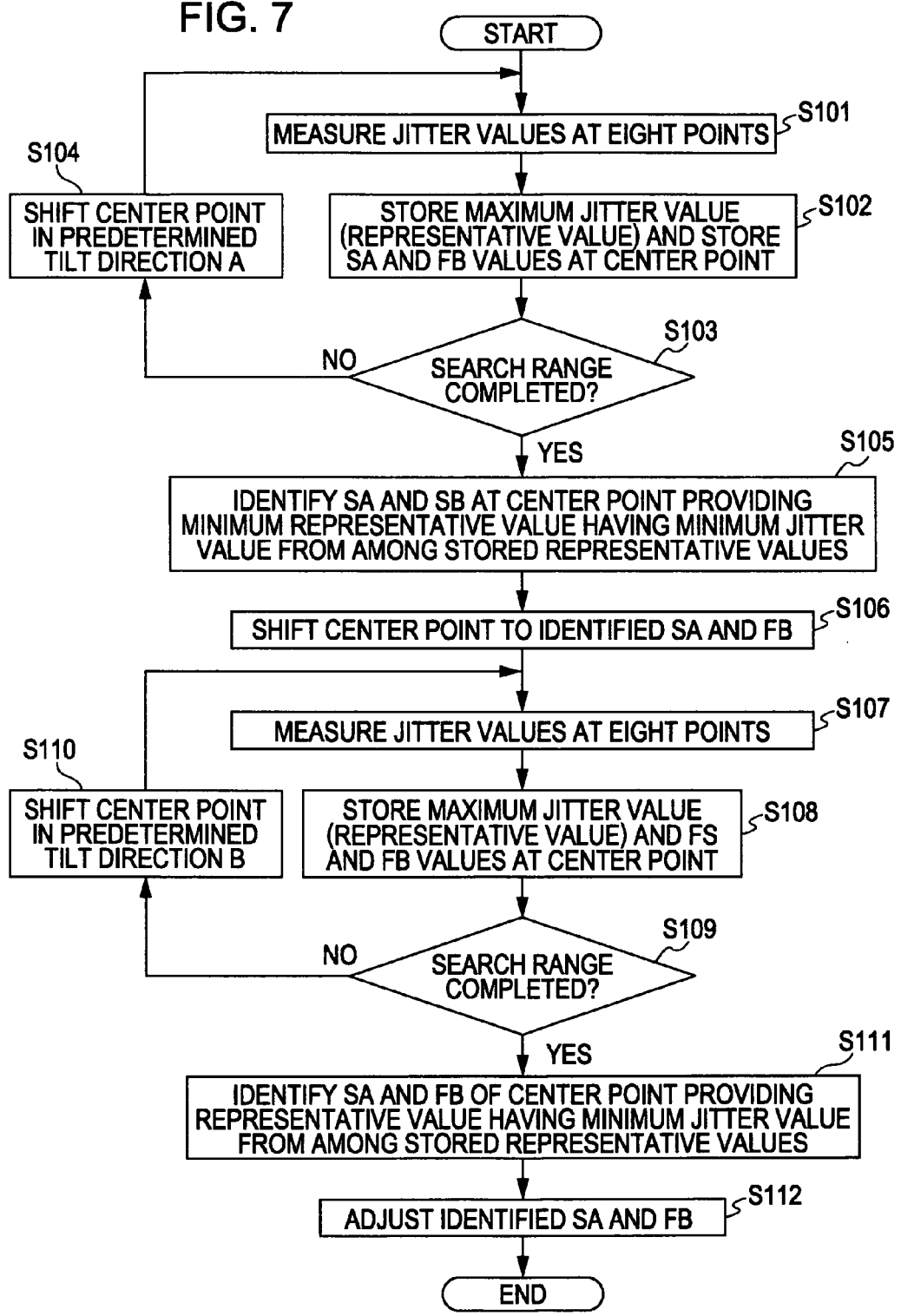
FIG. 7 is a flowchart illustrating the adjustment operation of the spherical aberration correction value in accordance with the first embodiment of the present invention.

In step S101 of FIG. 7, the jitter values are measured at the eight points. More specifically, the jitter values are measured at the measurement points Pw1-Pw8 of the outline of the assumed margin W having at the center point the current spherical aberration correction value and focus bias value. In step S101 performed for the first time, the current values are those at the initial position Pfrst.

In step S101, calculation is performed based on the spherical aberration correction value and the focus bias value at the current center point using $\alpha$ and $\beta$ respectively defined as the length of the assumed margin W in the spherical aberration correction value direction and the length of the assumed margin W in the focus bias value direction. The spherical aberration correction value and the focus bias value are determined at each of the measurement points Pw1-Pw8. More specifically, given (SAx, FBy) as the spherical aberration correction value and the focus bias value at the current center point, the spherical aberration correction value and the focus bias value at the measurement points are respectively, Pw1=(SAx+$\alpha$, FBy+$\beta$), Pw2=(SAx, FBy+$\beta$), Pw3=(SAx−$\alpha$, FBy+$\beta$), Pw4=(SAx−$\alpha$, FBy), Pw5=(SAx−$\alpha$, FBy−$\beta$), Pw6=(SAx, FBy−$\beta$), Pw7=(SAx+$\alpha$, FBy−$\beta$), and Pw8=(SAx+$\alpha$, FBy).

The spherical aberration correction values and the focus bias values at the measurement points Pw1-Pw8 thus determined are successively set to the spherical aberration correction value setter 20 and the focus bias setter 16, respectively. The jitter values successively measured by the evaluator 55a of FIG. 1 are input with these spherical aberration correction values and the focus bias values set.

In step S102, the spherical aberration correction value and the focus bias value at the center point are stored together with the maximum jitter value (representative value).

From among the jitter values obtained with the spherical aberration correction values and the focus bias values set, the maximum jitter value is identified and stored. The maximum jitter value is stored with the spherical aberration correction value and the focus bias value at the center point associated therewith.

In step S103, a determination process of determining whether the search range is completed is performed. More specifically, it is determined whether the search has been completed for each of the shift points within the range A set in the tilt direction A.

The center point is shifted in the spherical aberration correction value direction as previously discussed with reference to FIG. 5. In step S103, the value of the length of the range A in the spherical aberration correction value direction is added to the spherical aberration correction value at the initial position Pfrst, and the center point is shifted to the resulting spherical aberration correction value as the sum. The determination process of whether the jitter measurement at the eight measurement points has been performed with the center point shifted is performed.

If it is determined in step S103 that the search range has not been completed in the tilt direction A, processing proceeds to step S104 to shift the center point to the predetermined tilt direction A. More specifically, given (SAx, FBy) as the spherical aberration correction value and the focus bias value at the center point until now and the tilt direction A being "2," (SAx+1, FBy+2) is calculated.

The "shifting of the center point" does not require that the spherical aberration correction value and the focus bias value be actually set at the center point. The value of the center point for calculating the value at each Pw is simply calculated with respect to each shift point.

When the center point is shifted (selected) in step S104, processing returns to step S101. The eight point jitter measurement is performed again with the selected center point.

If it is determined in step S103 that the search range in the tilt direction A has been completed, the spherical aberration correction value and the focus bias value at the center point providing the representative value having the minimum jitter value from among the stored representative values are identified in step S105.

In step S106, the assumed margin W is shifted to the identified spherical aberration correction value and focus bias value. More specifically, the spherical aberration correction value and focus bias value thus identified are selected as the values at the center point for use in the eight point jitter measurement in step S107.

In step S107, the eight point jitter measurement is performed as in the same manner as in step S101.

In step S108, the maximum jitter value (representative value) and the spherical aberration correction value and the focus bias value at the corresponding center point are stored. In step S109, a determination of whether the search range has been completed in the tilt direction B is performed. In other words, it is determined whether the search process has been completed at each of all shift points within the range B set in the tilt direction B.

In step S109, the center point is shifted to the spherical aberration correction value that is obtained by subtracting the value of the length of the range B in the spherical aberration correction value from the spherical aberration correction value identified in step S105 (if the value of the length of the range B is set to be negative, by adding the value of the length of the range B in the spherical aberration correction value to the spherical aberration correction value identified in step S105), and whether the eight point jitter measurement is performed or not is determined.

If it is determined in step S109 that the search range has not been completed in the tilt direction B, processing proceeds to step S110 to shift the corresponding center point to in the predetermined tilt direction B. As in the shifting process in the tilt direction A (step S104), calculation is performed based on the spherical aberration correction value and the focus bias value at the center point until now and the tilt direction B to determine the center point subsequent to the shifting. The obtained center point is then used as a center point for a subsequent eight point jitter measurement (S107).

If it is determined in step S109 that the search range has been completed in the tilt direction B, the spherical aberration correction value and the focus bias value at the center providing the representative value having the minimum jitter value from among the stored representative values are identified in step S111.

In step S112, the adjustment to the identified spherical aberration correction value and focus bias value is performed. More specifically, the spherical aberration correction value and the focus bias value are set to the spherical aberration correction value setter 20 and the focus bias setter 16 to perform adjustment to the identified spherical aberration correction value and focus bias value.

Figure 8:
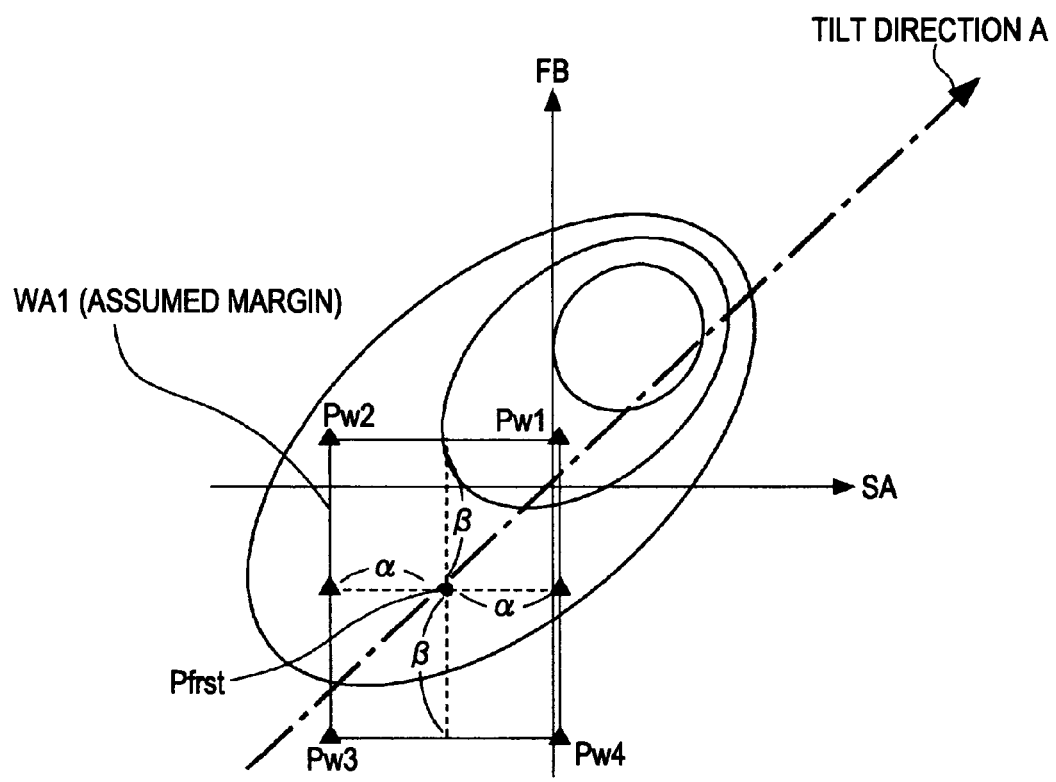
FIG. 8 illustrates a margin of the spherical aberration correction value in accordance with the first embodiment of the present invention.

In accordance with the first embodiment of the present invention, the number of measurement points Pw of the assumed margin W is set to eight. To further shorten the adjustment time, the measurement points Pw are limited to the four corner points of the assumed margin W (Pw1-Pw4) as shown in FIG. 8.

When the search range is shifted in the direction in which the contour lines are deformed to expand the ellipse or in the direction in which the contour lines are deformed to shrink the ellipse, the reduction in the number of measurement points Pw can lead to a failure to find the worst point along the outline of the assumed margin W (representative value). In many cases, a point of the assumed margin W providing the representative value is likely to be one of the four corner points. Depending on the distortion of the contour line of the jitter value characteristics, however, intermediate points between any two adjacent corner points of the four corner points (such as Pw2, Pw4, Pw6, and Pw8 as shown in FIG. 5) can become a point providing the representative value. In view of this possibility, a relatively large measurement points of eight are set as shown in FIGS. 5 and 6. The adjustment to the margin center position Pm-cent is thus reliably performed.

In accordance with the first embodiment of the present invention, the adjustment of the spherical aberration correction value and the focus bias value is performed at the moment the optical disk 1 is loaded. However, the adjustment of the spherical aberration correction value and the focus bias value may be performed during playback, prior to or subsequent to a seek operation, after time elapse of a predetermined period of time, or in response to a trace position (on an inner circle or an outer circle) on the optical disk 1. For example, during playback, the adjustment may be performed at a timing data read from the optical disk 1 is buffered. The adjustment may be performed at a timing in operation. Even if the spherical aberration correction value and the focus bias value are changed from the set values in response to a change in the optical characteristics due to the temperature change (temperature rise in particular), the spherical aberration correction value and the focus bias value are adjusted to keep track of the change.

The range A and the range B are defined as the ranges in which the center point is shifted in the tilt direction A and the tilt direction B, respectively. The adjustment may be performed without defining these ranges.

If the center point is shifted from the initial position Pfrst in one of the tilt direction A, the representative value may increase or decrease. The center point is shifted in one of the tilt direction A so that the jitter value of the representative value decreases. The representative value is obtained in each of the shift points. When the center point passes by the center point PAdec in the tilt direction A (see FIG. 5), the representative value begins increasing. When the representative value begins increasing with the center point shifted, the center point at the immediately prior shift point is determined to be the center point PAdec.

Similarly, the center point is shifted in the tilt direction B. The representative value is obtained by shifting the center point in the direction that the representative value decreases. At the moment the representative value begins increasing, the center point at the immediately prior shift point is determined to be center point Pdec (namely, the margin center position Pm-cent as shown in FIG. 6).

In this way, the adjustment process may be performed to the margin center position Pm-cent without the need for defining the range A and the range B.

A second embodiment of the present invention is described below.

As with the first embodiment of the present invention, the second embodiment provides the adjustment method of adjusting the spherical aberration correction value and the focus bias value in an adjustment time shorter than the adjustment time required by the technique of FIG. 4.

In accordance with the second embodiment of the present invention, a quadratic function having the spherical aberration correction value and the focus bias value as variables with respect to the jitter value measured at a plurality of predetermined measurement points (function generation measurement points) is generated, and the jitter values at the measurement points (Pa-Pd) are determined based on the quadratic function when the center point (Pcent) of the assumed margin W is shifted within the search area Ars as shown in FIGS. 4A-1 and 4A-2. This arrangement eliminates the need for measuring the jitter value with the SA value (spherical aberration correction value) and the FB value (focus bias value) set with the center point shifted to each shift point.

Figure 9B:
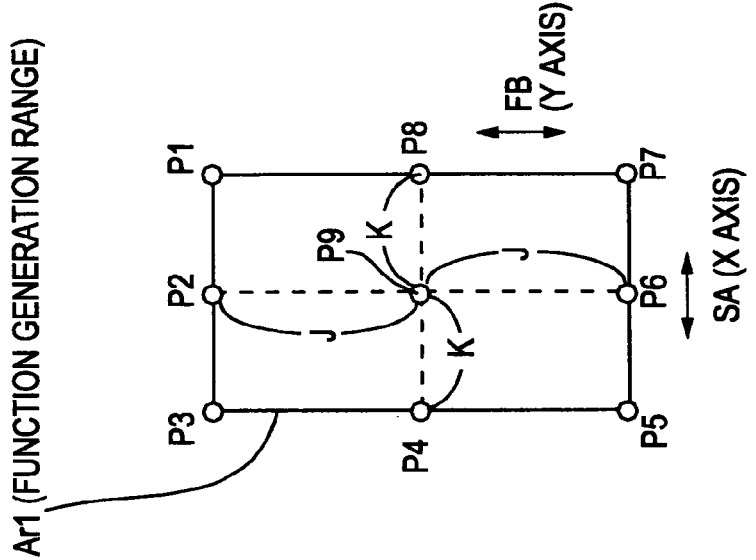
FIGS. 9A and 9B illustrate a quadratic function that is generated in the adjustment operation of the spherical aberration correction value in accordance with a second embodiment of the present invention.
Figure 9A:
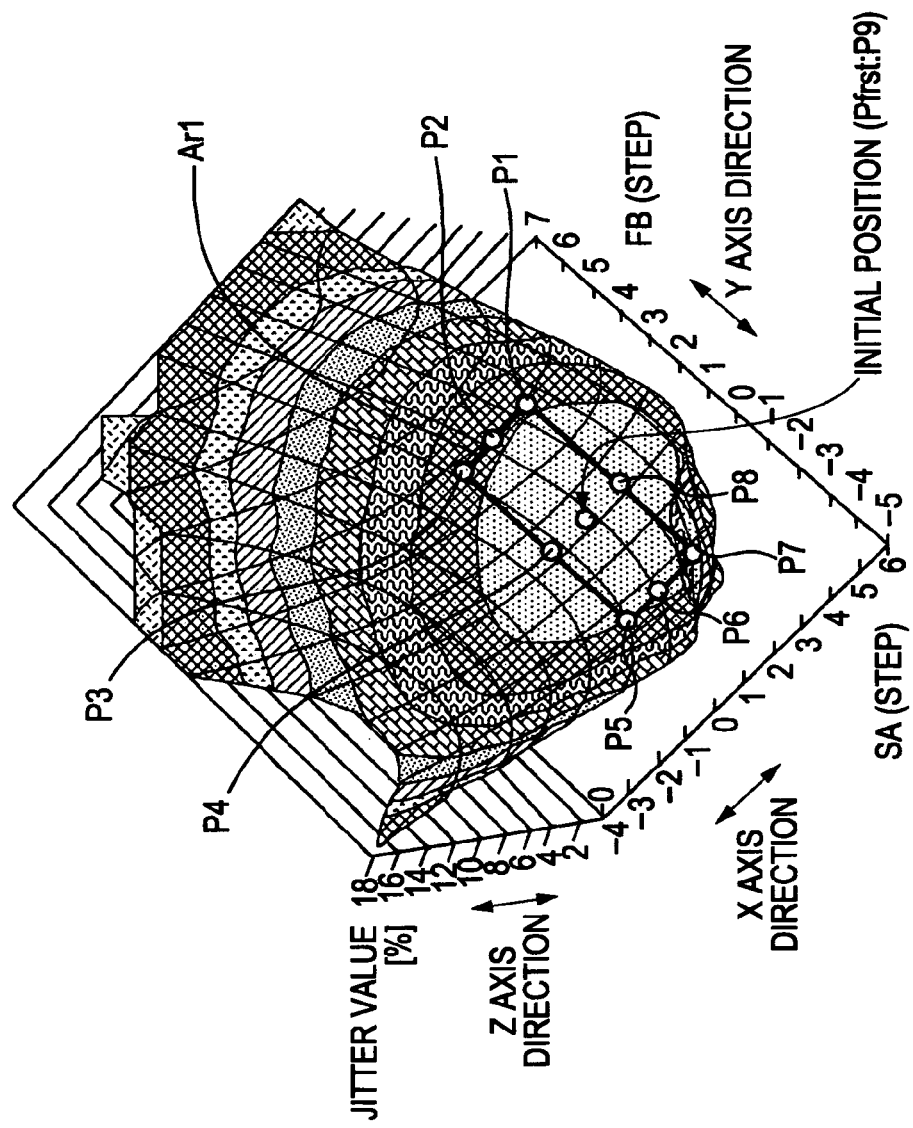

FIGS. 9A and 9B through FIG. 12 illustrate an adjustment process of the second embodiment of the present invention. FIGS. 9A, 10A, and 11A three-dimensionally illustrate the jitter value characteristics responsive to the spherical aberration correction value and the focus bias value with the spherical aberration correction value plotted in an X axis, the focus bias value plotted in a Y axis, and the jitter value plotted in a Z axis. The X axis, the Y axis and the Z axis are defined by an X axis direction, a Y axis direction and a Z axis direction, respectively. The jitter value characteristics are represented by a cone-like shape lying on the minimum jitter value.

Figure 10B:
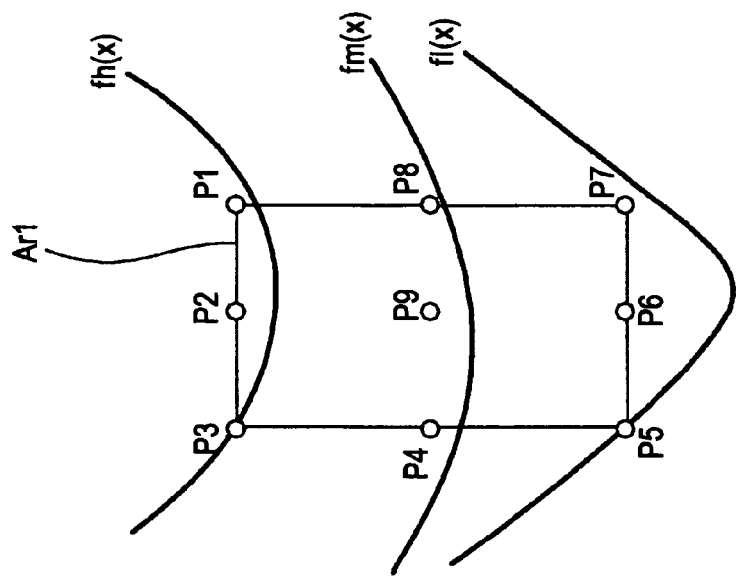
FIGS. 10A and 10B illustrate a quadratic function that is generated in the adjustment operation of the spherical aberration correction value in accordance with the second embodiment of the present invention.
Figure 10A:
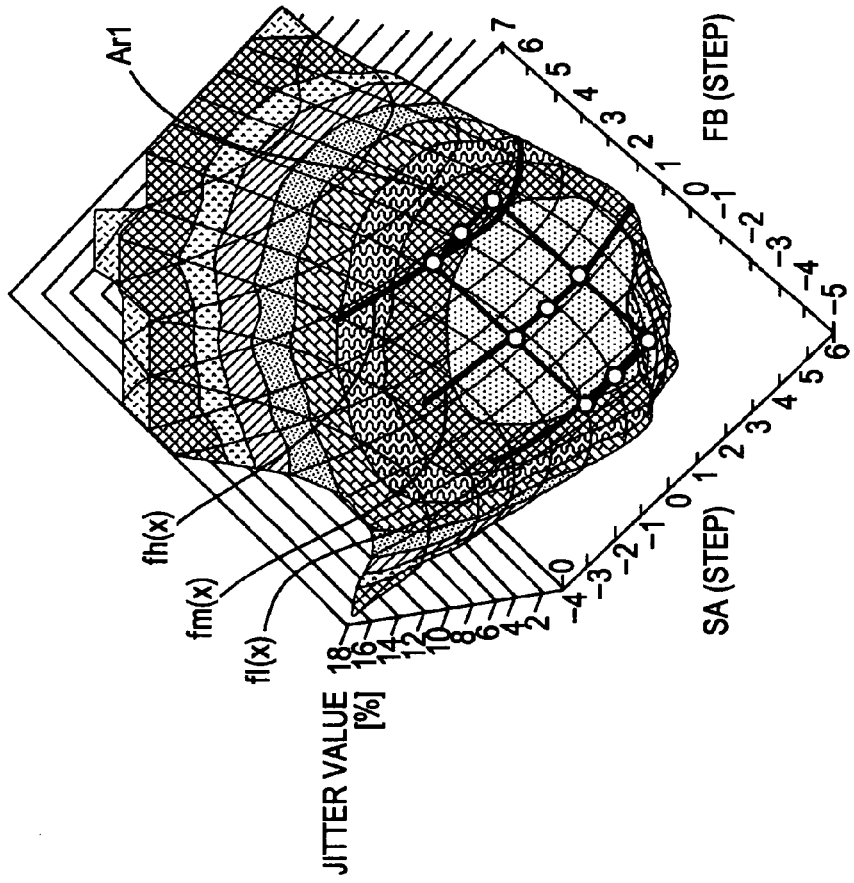
Figure 11B:
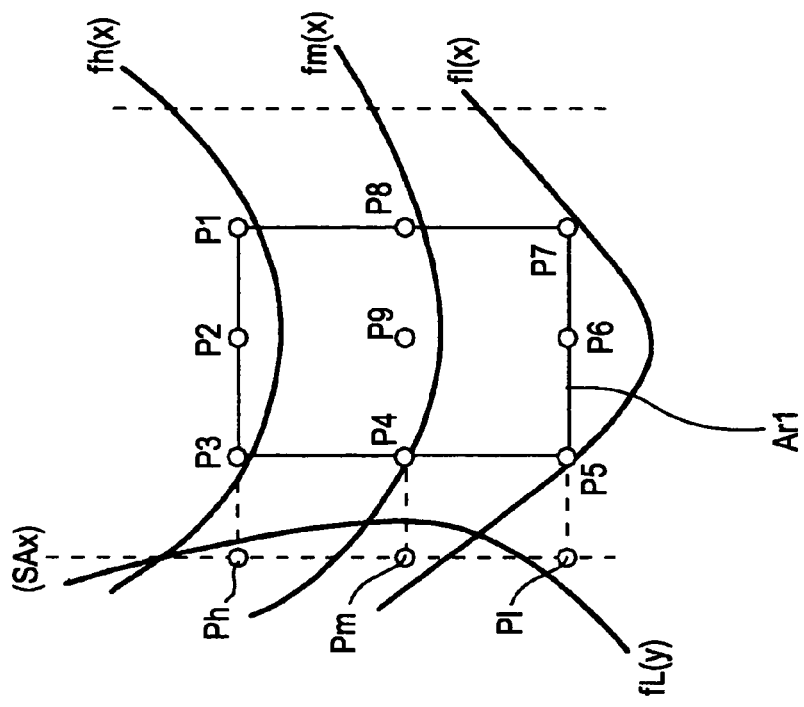
FIGS. 11A and 11B illustrate a quadratic function that is generated in the adjustment operation of the spherical aberration correction value in accordance with the second embodiment of the present invention.
Figure 11A:
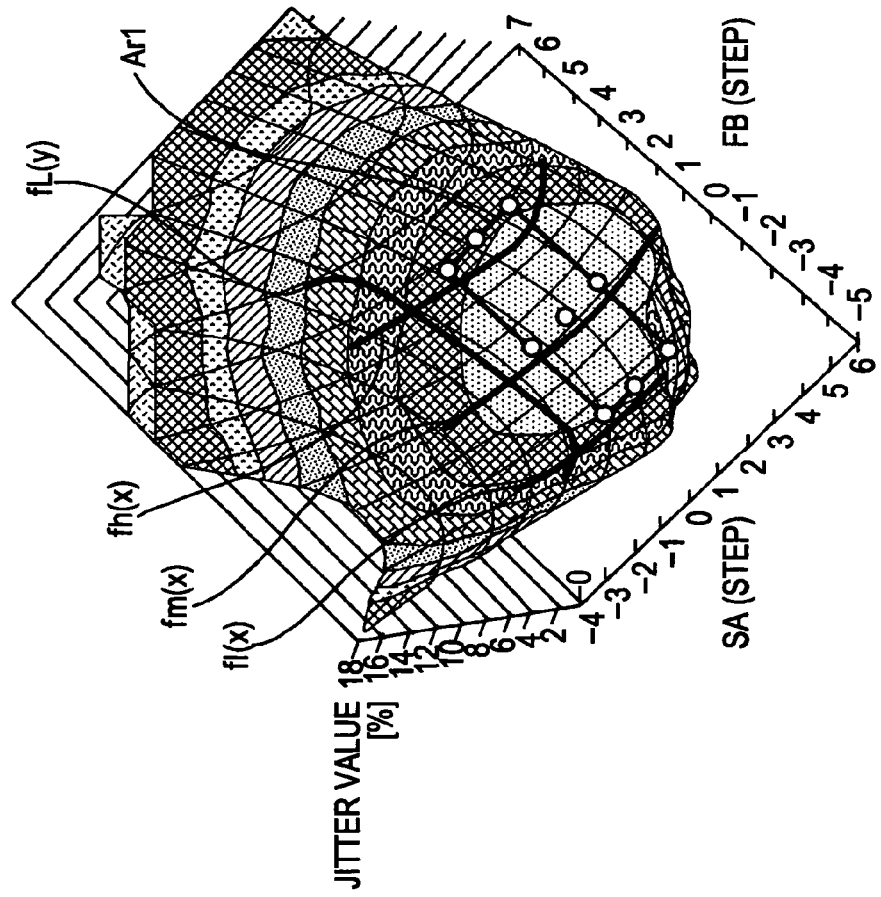

FIGS. 9B, 10B, and 11B illustrates function generation ranges Arl extracted from FIGS. 9A, 10A, and 11A, respectively.

Figure 12:
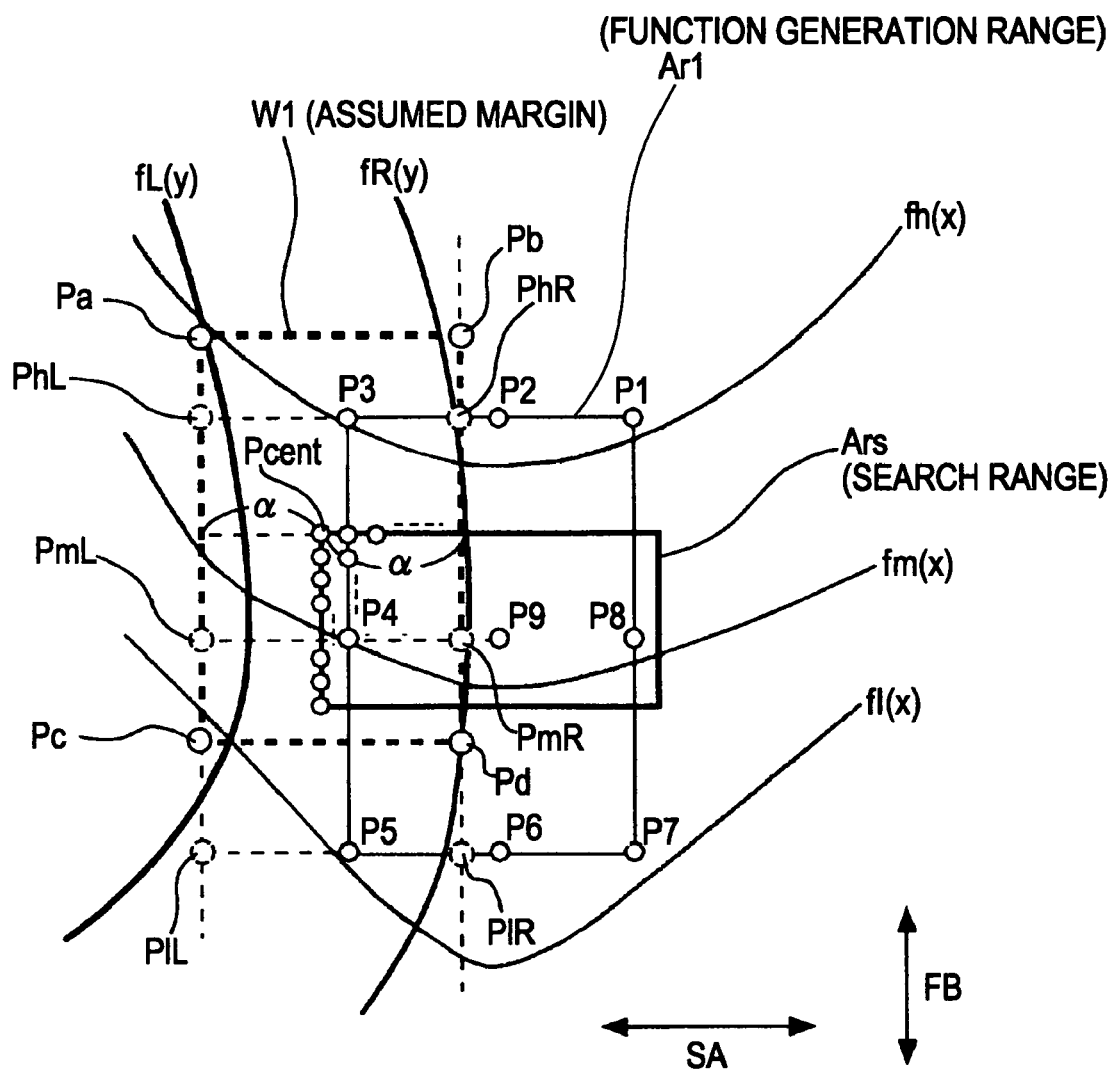
FIG. 12 illustrates in each measurement a jitter value that is calculated in accordance with the quadratic function generated in the adjustment operation of the spherical aberration correction value in accordance with the second embodiment of the present invention.

With reference to FIGS. 9A and 9B through FIGS. 11A and 11B, a generation method of generating a quadratic function is mainly described. FIG. 12 illustrates an actual adjustment operation based on the generated quadratic function.

The second embodiment of the present invention is based on the premise that the spherical aberration correction value and the focus bias value are set to the values at the initial position Pfrst in FIGS. 9A and 9B prior to the start of the adjustment.

Function generation measurement points P1-P8 centered on the initial position Pfrst are defined to create nine points in a grid extending in the spherical aberration correction value direction and in the focus bias value direction (with three points in the spherical aberration correction value direction and with three points in the focus bias value direction). As shown in FIG. 9B, at a position spaced by +J from the focus bias value at the initial position Pfrst in the focus bias value direction, a point having the sum of the spherical aberration correction value at the initial position Pfrst and +K is defined as the function generation measurement point P1, a point having the same spherical aberration correction value at the initial position Pfrst is defined as the function generation measurement point P2, and a point having the sum of the spherical aberration correction value at the initial position Pfrst and −K is defined as the function generation measurement point P3.

As two points having the same focus bias value as the initial position Pfrst, a point spaced from the initial position Pfrst in the spherical aberration correction value direction at by +K is defined as the function generation measurement point P8, and a point spaced from the initial position Pfrst in the spherical aberration correction value direction by −K is defined as the function generation measurement point P4. At a position spaced by −J from the focus bias value at the initial position Pfrst in the focus bias value direction, a point having the sum of the spherical aberration correction value at the initial position Pfrst and −K is defined as the function generation measurement point P5, a point having the same spherical aberration correction value at the initial position Pfrst is defined as the function generation measurement point P6, and a point having the sum of the spherical aberration correction value at the initial position Pfrst and +K is defined as the function generation measurement point P7.

A grid of the three points in the spherical aberration correction value direction, the three points in the focus bias value direction and the initial position Pfrst is thus generated. Three columns of measurement points, each column have the same spherical aberration correction value, and three rows of measurement points, each row having the same focus bias value are generated.

As shown in FIG. 9B, an area enclosed by connecting the function generation measurement points P1-P8 thus defined is referred to as a function generation area Arl.

As one of the nine function generation measurement points, the initial position Pfrst is also referred to as a function generation measurement point P9.

In the adjustment process of the second embodiment of the present invention, the jitter values are measured at the nine function measurement points. First, the jitter value is measured at the initial position Pfrst (P9) as the current set value. In the same manner as in the jitter value measurement at each measurement point Pw of the assumed margin W as previously discussed, the spherical aberration correction value and the focus bias value are set at each of the function generation measurement points P1-P8 and then the jitter values are measured at the measurement points.

When the jitter values are measured at the function generation measurement points P1-P9, quadratic functions are generated as shown in FIG. 10B.

As shown in FIG. 10B, three quadratic functions are generated with the focus bias value fixed and the spherical aberration correction value being variable with respect to the jitter value.

As previously discussed, the function generation measurement points P1-P9 are obtained, namely, three rows of three measurement points, each row having the same focus bias value, and three columns of three measurement points, each column having the same spherical aberration correction value.

The quadratic function is determined based on the jitter values and the spherical aberration correction values at the three measurement points P1, P2, and P3 having the same focus bias value. The quadratic function is determined approximating the jitter values with the focus bias values at three measurement points P1, P2, and P3 fixed and the spherical aberration correction value variable.

At the measurement points P1, P2, and P3, the quadratic function is determined as represented in equation (1):

$$f(x)=ax^2+bx+c \qquad (1)$$

The quadratic function f(x) approximated at the measurement points P1-P3 is denoted as fh(x) as shown in FIG. 10B.

The quadratic function is determined based on the jitter values and the spherical aberration correction values at the three measurement points P4, P9, and P8 having the same focus bias value. The quadratic function is approximated by the jitter values with the focus bias values at three measurement points P4, P9, and P8 fixed and the spherical aberration correction value variable.

The quadratic function f(x) approximated at the measurement points P4, P9, and P8 is denoted as fm(x).

The quadratic function is determined based on the jitter values and the spherical aberration correction values at the three measurement points P5, P6, and P7 having the same focus bias value, namely with the focus bias values at three measurement points P4, P9, and P8 fixed and the spherical aberration correction value variable.

The quadratic function f(x) approximated at the measurement points P4, P9, and P8 is denoted as fl(x).

When the quadratic functions (fh(x), fm(x), fl(x)) with the three different focus bias values fixed and the spherical aberration correction value variable are determined, quadratic functions with the spherical aberration correction value fixed and the focus bias value variable can be now generated as shown in FIG. 11B.

The three quadratic functions f(x) are determined. By substituting a variable x (namely, a spherical aberration correction value) in the quadratic function f(x), a point is determined by the spherical aberration correction value SAx and the focus bias value as being fixed in the quadratic function f(x), and the jitter value is calculated at the determined point.

More specifically, when a given spherical aberration correction value SAx is substituted for the variable x in the quadratic equation fh(x), the jitter value at the point identified by the focus bias value represented by Ph in FIG. 11B at the measurement points P1, P2, and P3 and the spherical aberration correction value SAx is obtained. Equally, when a spherical aberration correction value SAx is substituted for the variable x in the quadratic equation fm(x), the jitter value at the point identified by the focus bias value represented by Pm in FIG. 11B at the measurement points P4, P9, and P8 and the spherical aberration correction value SAx is obtained. Furthermore, when a spherical aberration correction value SAx is substituted for the variable x in the quadratic equation fl(x), the jitter value at the point identified by the focus bias value represented by P1 in FIG. 11B at the measurement points P5, P6, and P7 and the spherical aberration correction value SAx is obtained.

The jitter values at three points having the same spherical aberration correction value are thus determined from the three different quadratic functions f(x) with the spherical aberration correction value as a variable x. If the jitter values are determined at three different points having the same spherical aberration correction value, a quadratic function f(y)(denoted fL(y)) is determined with the focus bias value variable with the spherical aberration correction value fixed through the approximation at the three different points in a manner similar to the case of the quadratic function f(x).

The quadratic function f(y) with the focus bias value being a variable y is expressed as equation (2):

$$f(y) = ay^2 + by + c \quad (2)$$

The quadratic function f(y) with the focus bias value being the variable y and the spherical aberration correction value fixed at any value is generated from the three quadratic functions f(x).

In accordance with the second embodiment of the present invention, the jitter values at the points of the assumed margin W (Pa, Pb, Pc, and Pd) are calculated with respect to each shift point discussed with reference to FIG. 4B using the quadratic function f(y) with any spherical aberration correction value fixed. Without the need for setting the spherical aberration correction value and the focus bias value at each point, the jitter value can be obtained. The adjustment time is thus shortened.

The adjustment process of the second embodiment of the present invention is described below with reference to FIG. 12.

FIG. 12 illustrates the function generation area Arl defined by the function generation measurement points P1-P9 shown in FIGS. 9B, 10B, and 11B, and the search area Ars shown in FIG. 4B. FIG. 12 also illustrates the required margin W1, also shown in FIG. 4B, with the center point Pcent positioned at the search starting position of the search area Ars. FIG. 12 further illustrates the quadratic functions fh(x), fm(x), and fl(x) generated at the function generation measurement points.

Referring to FIG. 12, as in the basic adjustment process of the embodiment discussed with reference to FIG. 4B, the assumed margin W is shifted with the center point Pcent within the search area Ars, then jitter values are measured at the measurement points Pa-Pd, and the worst value of the jitter values is stored as a representative value.

The measurement points requiring the measurement of the jitter value are the measurement points Pa-Pd in the assumed margin W at the shift point when the center point Pcent is shifted to each shift point within the search area Ars.

In accordance with the adjustment process of the second embodiment of the present invention, the quadratic function f(y) for obtaining the jitter values at the measurement points Pa-Pd in the assumed margin W with respect to each shift point is generated from the quadratic function f(x) obtained from the function generation measurement points P1-P9.

More specifically, the center point Pcent is successively shifted in the focus bias value direction from the assumed margin W1 with the center point Pcent positioned at the starting position within the search area Ars, and the jitter values at the measurement points Pa-Pd are calculated with respect to each shift point. The jitter values at the measurement points Pa-Pd are calculated with respect to each shift point by generating the quadratic functions fL(y) and fR(y) shown.

The quadratic function fL(y) has the focus bias value as a variable y with respect to a line containing the measurement points Pa and Pc in the assumed margin W (namely, fixed to the spherical aberration correction values at Pa and PC). The jitter values are determined by calculating the quadratic function fL(y) for any focus bias value on the line. Similarly, the quadratic function fR(y) has the focus bias value as a variable y with respect to a line containing the measurement points Pb and Pd in the assumed margin W (namely, fixed to the spherical aberration correction values at Pb and Pd). The jitter values are determined by calculating the quadratic function fR(y) for any focus bias value on the line.

The spherical aberration correction values at the measurement points Pa and Pc in the assumed margin W are values that are obtained by subtracting, from the spherical aberration correction value at the center point Pcent, "$\alpha$" defining the width of the spherical aberration correction value in the required assumed margin W of FIG. 4A-1. As for the quadratic function fL(y), the spherical aberration correction value, namely, "spherical aberration correction value at the center point Pcent$-\alpha$" is substituted in the quadratic functions fh(x), fm(x), and fl(x) to determine the jitter values at PhL, PmL, and PlL. The quadratic function fL(y) is generated by performing an approximation process at PhL, PmL, and PlL.

The spherical aberration correction values at the measurement points Pb and Pd in the assumed margin W are values that are obtained by adding "$\alpha$" to the spherical aberration correction value at the center point Pcent. As for the quadratic function fR(y), the spherical aberration correction value, namely, "spherical aberration correction value at the center point Pcent$+\alpha$" is substituted in the quadratic functions fh(x), fm(x), and fl(x) to determine the jitter values at PhL, PmL, and PlL. The quadratic function fR(y) is generated by performing an approximation process at PhL, PmL, and PlL.

Once the quadratic functions fL(y) and fR(y) are obtained, the jitter values are obtained at the measurement points Pa, Pb, Pc, and Pd by substituting the focus bias values at the measurement points Pa and Pc and the measurement points Pb and Pd in the quadratic functions fL(y) and fR(y) and then solving the quadratic functions fL(y) and fR(y).

The jitter value at the measurement point Pa is solved by substituting "the focus bias value at the center point Pcent$+\beta$" as the variable y in the quadratic function fR(y). The jitter value at the measurement point Pc is solved by substituting "the focus bias value$-\beta$" as the variable y in the quadratic function fL(y).

The jitter value at the measurement point Pb is solved by substituting "the focus bias value at the center point Pcent$+\beta$" as the variable y in the quadratic function fR(y). The jitter value at the measurement point Pd is solved by substituting "the focus bias value at the center point Pcent$-\beta$" as the variable y in the quadratic function fR(y).

Depending on the quadratic function fL(y), the jitter value with any focus bias value on the line containing the measurement point Pa and the measurement point Pc can be determined. Depending on the quadratic function fR(y), the jitter value with any focus bias value on the line containing the measurement point Pb and the measurement point Pd can be determined.

The quadratic function fL(y) and the quadratic function fR(y) are used to calculate the jitter values at the measurement points Pa-Pd with respect to each shift point when the center point Pcent of the assumed margin W1 at the start position of the search area Ars is shifted to an end position in the focus bias value direction.

When the center point Pcent is shifted from the position thereof shown by one step in only the focus bias value direction, the jitter value at the measurement point Pa is determined by substituting in the quadratic function fL(y) a value that is obtained by subtracting the focus bias value of one step from a value substituted as the focus bias value at the measurement point Pa in the immediately preceding shift point (starting position).

The jitter value at the measurement point Pc is determined by substituting in the quadratic function fL(y) a value that is obtained by subtracting the focus bias value of one step from a value substituted as the focus bias value at the measurement point Pc in the immediately preceding shift point (starting position).

The jitter values at the measurement points Pb and Pd are determined by substituting in the quadratic function fR(y) a value that is obtained by subtracting the focus bias value of one step from values substituted as the focus bias values at the measurement points Pb and Pd with respect to the immediately preceding shift point (starting position).

Similarly, the jitter values are successively calculated by updating the focus bias values to be substituted. The jitter values at the measurement points Pa-Pd are thus determined with respect to each shift point with the center point Pcent at the starting position shifted to the end point of the search area Ars in the focus bias value direction. The jitter values at the measurement points Pa-Pd are thus determined with respect to each shift point in response to the spherical aberration correction values of one row at the center point Pcent with respect to the starting position (for each shifting to W1-Wm as shown in FIG. 4B).

With reference to FIG. 4B, the worst value of the jitter values is stored as the representative value when the jitter values at the measurement points Pa-Pd are determined with respect to each shift point. In this case, as well, the representative value is stored at each shift point in the course of calculating the jitter values at the measurement points Pa-Pd with respect to each shift point.

Jitter value calculation and storage of the representative value are performed at each shift point for one row of the spherical aberration correction values. The jitter value calculation and storage of the representative value are also performed on another row of the spherical aberration correction values in the search area Ars. In other words, the jitter value calculation and storage of the representative value are performed to the l-th row of the spherical aberration correction values as shown in FIG. 4B.

On a next row of the spherical aberration correction values with respect to the center point Pcent as the starting position, the spherical aberration correction value that is obtained by subtracting "α" from the spherical aberration correction value at the center point Pcent of the next row of the spherical aberration correction value is substituted for a variable x in each of the quadratic functions fh(x), fm(x), and fl(x). The jitter values are determined at the three points identified from the spherical aberration correction value responsive to "the spherical aberration correction value at the center point Pcent−α" and the focus bias values at function generation measurement points P1, P2 and P3, function generation measurement points P4, P9, and P8, and the function generation measurement points P5, P6, and P7. The approximation process is performed on the three points, thereby generating the quadratic function fL(y).

The spherical aberration correction value that is obtained by adding "α" to the spherical aberration correction value at the center point Pcent of a next row of the spherical aberration correction value is substituted for a variable x in each of the quadratic functions fh(x), fm(x), and fl(x). The jitter values are determined at the three points identified from the spheri-cal aberration correction value responsive to "the spherical aberration correction value at the center point Pcent+α" and the focus bias values at function generation measurement points P1, P2 and P3, function generation measurement points P4, P9, and P8, and the function generation measurement points P5, P6, and P7. The approximation process is performed on the three points, thereby generating the quadratic function fR(y).

As previously discussed, the focus bias values at the measurement points Pa-Pd with respect to each shift point are substituted in the quadratic function fL(y) and the quadratic function fR(y) newly generated for the next row of the spherical aberration correction values, and the jitter values at the measurement points Pa-Pd are thus calculated with respect to each shift point.

The generation of the quadratic function fL(y) and the quadratic function fR(y), the jitter calculation at the measurement points Pa-Pd using these quadratic functions f(y), and the storage of the representative value at each shift point are repeated until the final row (l-th row) of the spherical aberration correction values in the search area Ars. The representative values are thus obtained at the shift points with the center point Pcent shifted to each of all shift points within the search area Ars.

The minimum (best) representative value is identified from among the representative values of the shift points, and the spherical aberration correction value and the focus bias value are adjusted to the center point Pcent of the assumed margin W providing the minimum representative value. As previously discussed with reference to FIG. 4B, the spherical aberration correction value and the focus bias value are adjusted to the margin center position Pm-cent (position of the center point Pdec in FIG. 4B).

With reference to FIG. 4B, the representative value is stored at each shift point in the course of shifting the assumed margin W to W1 to Wn, and after obtaining the representative values at all shift points, the minimum (best) representative value is identified from among the representative values.

There is no problem with this basic concept. However, storing the representative values at all shift points is not preferable from the standpoint of memory saving.

In accordance with the second embodiment of the present invention, the minimum representative value is identified on each row of the spherical aberration correction values and then stored. From among the minimum representative values, each obtained on a per row basis, the minimum representative value providing the minimum jitter value (also referred to as the smallest minimum representative value) is identified.

The representative values stored to identify the smallest minimum representative value are reduced to the representative values of each row of spherical aberration correction values to identify the representative values at each row and the minimum representative value identified at each row.

The adjustment method of the spherical aberration correction value and the focus bias value in accordance with the second embodiment of the present invention has been discussed. The jitter values at the measurement points Pa-Pd with respect to each shift point required for the adjustment to the margin center position Pm-cent are thus calculated without the need for actually setting the spherical aberration correction value and the focus bias value in response to each shift point.

The spherical aberration correction values and the focus bias values at the nine points as the function generation measurement points are set to generate the quadratic functions f(x) and f(y), and the jitter values at the nine points are simply measured. The jitter values at the measurement points Pa-Pd are thereafter calculated with respect to the shift point.

The number of measurements of jitter values with the spherical aberration correction value and the focus bias value set therewith is relatively as small as nine times. In accordance with the second embodiment of the present invention, the adjustment to the margin center position Pm-cent is performed for an even shorter period of time.

The adjustment process of the spherical aberration correction value and the focus bias value in accordance with the second embodiment of the present invention is described below with reference to a flowchart of FIG. 13.

Figure 13:
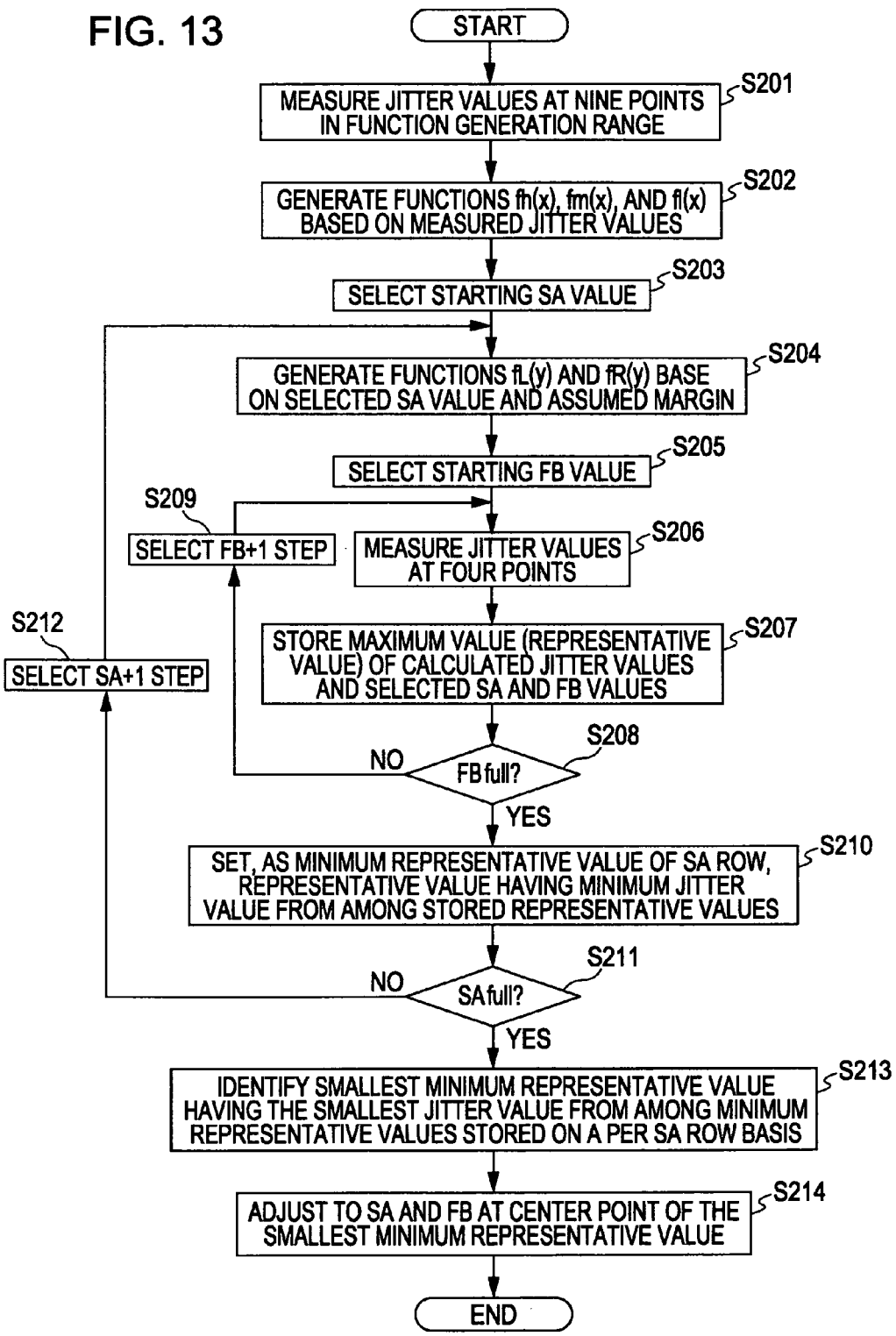
FIG. 13 is a flowchart illustrating the adjustment operation of the spherical aberration correction value in accordance with the second embodiment of the present invention.

The system controller 60 of FIGS. 1 and 3 performs the process of FIG. 13 under the control of a program stored on a ROM or the like housed therewithin.

The process of FIG. 13 is performed on the premise that the optical disk 1 is loaded on the recording and reproducing apparatus and the spherical aberration correction value and the focus bias value are set to the values at the initial position Pfrst as discussed with reference to FIG. 9.

As shown in FIG. 13, in step S201, a nine point jitter measurement process is performed within the function generation area Arl. The jitter value is measured at the set initial position Pfrst. The values of the function generation measurement points P1-P8 are determined by adding or subtracting "J" or "K" of FIG. 9B to and from the initial position Pfrst. A command is issued to successively set these values to the spherical aberration correction value setter 20 and the focus bias setter 16. The jitter values successively set by the evaluator 55a of FIG. 1 with these spherical aberration correction values and the focus bias values set are input.

The jitter values at the nine function generation measurement points P1-P9 are thus obtained.

In step S202, the quadratic functions fh(x), fm(x), and fl(x) are generated based on the measured jitter values. The quadratic function fh(x) is determined based on the jitter values at the three measurement points P1, P2, and P3 having the same focus bias value and the spherical aberration correction values at the three measurement points. The quadratic function fh(x) has the focus bias values at the three measurement points P1, P2, and P3 fixed and the spherical aberration correction value being the variable x as previously discussed with reference to equation (1).

Similarly, the quadratic function fm(x) is determined based on the jitter values at the three measurement points P4, P9, and P8 having the same focus bias value and the spherical aberration correction values at the three measurement points. The quadratic function fm(x) has the focus bias values at the three measurement points P4, P9, and P8 fixed and the spherical aberration correction value being the variable x.

Furthermore, the quadratic function fl(x) is determined based on the jitter values at the three measurement points P5, P6, and P7 having the same focus bias value and the spherical aberration correction values at the three measurement points. The quadratic function fl(x) has the focus bias values at the three measurement points P5, P6, and P7 fixed and the spherical aberration correction value being the variable x.

In step S203, a starting SA (spherical aberration correction value) value is selected. A spherical aberration correction value set as a start point of search within the search area Ars is selected as a spherical aberration correction value at the center point Pcent of the assumed margin W. As previously discussed, the searching process is performed with the center point Pcent shifted along a row of spherical aberration correction values from the first value.

In step S204, the quadratic function fL(y) and the quadratic function fR(y) are generated based on the selected SA value and the assumed margin W.

To generate the quadratic function fL(y), the SA value at the center point Pcent may be "SAx," and the width of the assumed margin W in the spherical aberration correction value direction may be $2\alpha$. The quadratic functions fh(x), fm(x), and fl(x) are solved with a spherical aberration correction value of "SAx−$\alpha$" substituted for the variable x. The jitter value at a point (for example, PhL of FIG. 12) identified by the same focus bias value of the measurement points P1, P2, and P3 and the spherical aberration correction value SAx−$\alpha$ is obtained. The jitter value at a point (for example, PmL of FIG. 12) identified by the same focus bias value of the measurement points P4, P9, and P8 and the spherical aberration correction value SAx−$\alpha$ is obtained. The jitter value at a point (for example, PlL of FIG. 12) identified by the same focus bias value of the measurement points P5, P6, and P7 and the spherical aberration correction value SAx−$\alpha$ is obtained.

The quadratic function fL(y), approximated at these three points with the spherical aberration correction value SAx−$\alpha$ fixed, and the focus bias value being as the variable y is generated as discussed with reference to equation (2).

To generate the quadratic function fR(y), the SA value at the center point Pcent may be "SAx," and the width of the assumed margin W in the spherical aberration correction value direction may be $2\alpha$. The quadratic functions fh(x), fm(x), and fl(x) are solved with a spherical aberration correction value of "SAx+$\alpha$" substituted for the variable x. The jitter value at a point (for example, PhR of FIG. 12) identified by the same focus bias value of the measurement points P1, P2, and P3 and the spherical aberration correction value SAx+$\alpha$ is obtained. The jitter value at a point (for example, PmR of FIG. 12) identified by the same focus bias value of the measurement points P4, P9, and P8 and the spherical aberration correction value SAx+$\alpha$ is obtained. The jitter value at a point (for example, PlR of FIG. 12) identified by the same focus bias value of the measurement points P5, P6, and P7 and the spherical aberration correction value SAx+$\alpha$ is obtained.

The quadratic function fR(y), approximated at these three points with the spherical aberration correction value SAx+$\alpha$ fixed, and the focus bias value being as the variable y is generated as discussed with reference to equation (2).

In step S205, a starting FB (focus bias value) is selected. More specifically, a focus bias value set as a starting point within the search area Ars is selected as a focus bias value at the center point Pcent of the assumed margin W. The searching process is performed with the center point Pcent shifted along a row of spherical aberration correction values from the first value of the focus bias value in the focus bias value direction.

In step S206, a four point jitter calculation process is performed. In other words, the jitter values at the measurement points Pa-Pd of the assumed margin W are calculated with the center point Pcent of the assumed margin W positioned at the selected spherical aberration correction value and focus bias value.

The length of the assumed margin W in the spherical aberration correction value direction may be $2\beta$ and focus bias value at the center point Pcent may be "FBy." The focus bias values are determined at the measurement points Pa-Pd wherein the measurement point Pa="FBy+$\beta$," the measurement point Pc="FBy−$\beta$," the measurement point Pb="FBy+$\beta$," and the measurement point Pd="FBy−$\beta$."

The quadratic function fL(y) is solved with the measurement point Pa "FB+$\beta$" and the measurement point Pb "FBy−$\beta$" substituted for the variable y to calculate the jitter values at the measurement point Pa and the measurement point Pc. The quadratic function fR(y) is solved with the measurement point Pb "FBy+β" and the measurement point Pd "FBy−β" substituted for the variable y to calculate the jitter values at the measurement point Pb and the measurement point Pd.

In step S207, the maximum value (representative value) of the calculated jitter values, and the values of the selected SA (spherical aberration correction value) and FB (focus bias value) are stored. More specifically, the maximum value (representative value) is identified from among the calculated jitter values. The identified representative value and the selected spherical aberration correction value and focus bias value (namely, those at the center point Pcent) are stored with one in association with another.

In step S208, a determination process is performed to determine whether FB values become full. More specifically, it is determined whether the currently selected focus bias value becomes a value set as a focus bias value at the end point of the search area Ars in the focus bias value direction (the focus bias value at an FB end point, namely, the focus bias value at an m-th column). In this way, it is determined whether the shifting of a given one row of spherical aberration correction values is completed.

Since the search area Ars is a fixed range, the number of FB columns contained in the search area Ars is known (m columns in this case). Alternatively, it is determined in step S208 whether a predetermined number of shifts (selections) of the FB value has been performed.

If it is determined in step S208 that the currently selected focus bias value has not yet reached the FB end value, processing proceeds to step S209 to select FB+one step. More specifically, the sum of the currently selected focus bias value and one step is selected as a focus bias value.

Processing returns to step S206 to perform a four point jitter calculation process based on the newly selected focus bias value.

If it is determined in step S208 that the current selected focus bias value has become the FB end value, the representative value having the minimum jitter value from among the stored representative values is set as a minimum representative value of that SA row.

As previously discussed, storing the minimum representative value at each SA row requires less memory than storing the representative values at all shift points. In step S210, the representative values other than the minimum representative value set and the SA and FB values corresponding to the representative values other than the minimum representative value are deleted. Alternatively, an overwrite process may be additionally performed. With this arrangement, a memory (such as a RAM of the system controller 60) is sufficient enough if the memory can store the minimum representative value at each SA row (and the SA and FB values at the corresponding center point Pcent). The memory is smaller in size than the memory that stores the representative values at all shift points (and the SA and FB values at the center points Pcent).

The minimum representative value of each SA row is stored, and then the smallest representative value (smallest minimum representative value) is finally identified from among the minimum representative values. This method also identifies the same representative value as the one that is identified in the method that the minimum representative value is identified from the representative values of all shift points. The method of storing the minimum representative value of each SA row, and then identifying the smallest representative value from among the minimum representative values provides the same result as the method of identifying the minimum representative value from the representative values of all shift points.

It is then determined in step S211 whether the SA value becomes full. More specifically, it is determined whether the currently selected spherical aberration correction value becomes a value set as a spherical aberration correction value at the end point of the search area Ars in the spherical aberration correction value direction (SA end point value, namely, the spherical aberration correction value at an l-th row in FIG. 4B). It is thus determined whether the shifting to all spherical aberration correction value rows within the search area Ars has been performed.

The number of rows of spherical aberration correction values may be learned beforehand from the fixed search area Ars (the l rows in this case). In step S211, it is determined whether a predetermined number of shifts (selections) of the SA value has been performed.

If it is determined in step S211 that the currently selected spherical aberration correction value has not reached the SA end point value, processing proceeds to step S212 to select SA+one step. The sum of the currently selected spherical aberration correction value and one step is selected as a spherical aberration correction value.

Processing returns to step S204 as shown in FIG. 13. New quadratic function fL(y) and quadratic function fR(y) are then generated based on the newly selected spherical aberration correction value.

If it is determined in step S211 that the currently selected spherical aberration correction value has reached the SA end point value, a representative value having the smallest minimum jitter value is identified from among the representative values stored on a per row basis.

In step S214, the adjustment process is performed to the spherical aberration correction value and the focus bias value at the center point Pcent providing the identified smallest minimum representative value. The spherical aberration correction value and the focus bias value are respectively set to the spherical aberration correction value setter 20 and the focus bias setter 16 to make the adjustment to the identified spherical aberration correction value and focus bias value.

In this way, the spherical aberration correction value and the focus bias value become the margin center position Pmcent.

In accordance with the second embodiment of the present invention, the adjustment of the spherical aberration correction value and the focus bias value is performed at the moment the optical disk 1 is loaded. However, the adjustment of the spherical aberration correction value and the focus bias value may be performed during playback, prior to or subsequent to a seek operation, after time elapse of a predetermined period of time, or in response to a trace position (on an inner circle or an outer circle) on the optical disk 1.

For example, during playback, the adjustment may be performed at a timing data read from the optical disk 1 is buffered. The adjustment may be performed at a timing in operation. Even if the spherical aberration correction value and the focus bias value are changed from the set values in response to a change in the optical characteristics due to the temperature change (temperature rise in particular), the spherical aberration correction value and the focus bias value are adjusted to keep track of the change.

In accordance with the second embodiment of the present invention, the nine function generation measurement points P1-P9 are used. As previously discussed, at least the three points in the spherical aberration correction value direction and at least the three points in the focus bias value direction are arranged in a grid so that at least the total of nine function generation measurement points are obtained. In other words, at least three rows, each row having three measurement points having the same focus bias value are arranged, and at least three columns, each column having three measurement points having the same spherical aberration correction value are arranged. At least three quadratic functions f(x) having the spherical aberration correction value as a variable are thus generated.

At least three quadratic functions f(x) are generated as first quadratic functions. The first quadratic function is required to obtain the quadratic function f(y) (as a second quadratic function). The second quadratic function is required to calculate the jitter values at the measurement points in the assumed margin W with the center point Pcent shifted within the search area Ars.

With at least the nine points of 3×3 set as the function generation measurement points, the first quadratic function required to obtain the second quadratic function is generated. More function generation measurement points, for example, 4×4, or 5×5, may be set to generate the second quadratic function closer to actual jitter value characteristics.

If the number of function generation measurement points is increased, more time is required to generate the first quadratic function. The use of more function generation measurement points is not preferable from the standpoint of reducing adjustment time.

Even with the 3×3 function generation measurement points, a first quadratic function closer to the actual jitter value characteristics is generated by keeping a wide spacing between the function generation measurement points. If the function generation area Arl is set to be too wide, the tracking servo becomes out of range. The function generation area Arl (namely, the value of "K" and "J" of FIG. 9B) is set to be appropriate in a manner such that the tracking servo keeps to the range thereof while the spacing between the function generation measurement points is sufficiently wide.

In accordance with the second embodiment of the present invention, the searching process is performed with the center point Pcent shifted along each spherical aberration correction value row within the search area Ars in the focus bias value direction. The three quadratic functions f(x) with the spherical aberration correction value as a variable are first generated, and then the quadratic function f(y) as the second quadratic function is generated based on the three quadratic functions f(x).

If the searching process is performed with the center point Pcent shifted along each focus bias value column within the search area Ars in the spherical aberration correction value direction, the three quadratic functions f(y) having the focus bias value as a variable are generated and the quadratic function f(x) as a second quadratic function is then generated based on the three quadratic functions f(y).

In accordance with the second embodiment of the present invention, the second quadratic functions are successively generated for each spherical aberration correction value row of the center point Pcent (or for each focus bias value column if the searching process is performed on a per focus bias value column). Alternatively, the second quadratic functions are generated first for all spherical aberration correction value rows (all focus bias value columns) from the first quadratic functions, and the jitter value calculation is then performed on each spherical aberration correction value row (each focus bias value column).

In accordance with the second embodiment of the present invention, the minimum representative value of one SA row is successively stored. However, the following method allows only one representative values to be stored at any given time.

Each time one representative value is obtained, the representative value is compared with the representative value at the immediately preceding shift point. The immediately preceding representative value, if larger than the current representative value, is updated by the current representative value while the immediately preceding representative value, if smaller than the current representative value, remains stored without being updated. In this way, only one representative value is stored to hold the minimum representative value at the SA row.

To determine the smallest minimum representative value, the number of representative values to be stored is one. As discussed above, each time one representative value is obtained, the obtained representative value is compared with the representative value at the immediately preceding shift point. The immediately preceding representative value, if larger than the current representative value, is updated by the current representative value while the immediately preceding representative value, if smaller than the current representative value, remains stored without being updated. In this way, only one representative value is stored to hold the minimum representative value at the SA row. This process is performed for all SA rows. Through this process, the finally stored representative value becomes the smallest minimum representative value. The number of representative values to be stored is only one in the determination of the smallest minimum representative value.

In accordance with each of the preceding embodiments, the spherical aberration correction value and the focus bias value are adjusted to the center point when the representative value providing the best jitter value is obtained. In addition to the adjustment of the center point with the representative value providing the best jitter value, the spherical aberration correction value and the focus bias value may be adjusted to the value of the center point providing a jitter value that is found to be lower than a predetermined value (in other words, the evaluation signal value is better by a predetermined amount).

In the adjustment of the spherical aberration correction value and the focus bias value, a value different from an actual evaluation signal value can be acquired depending on variations in the measurement for acquiring the evaluation signal value. The acquisition of the evaluation value different from an actual evaluation value can lead to variations in an adjustment value if the adjustment is made to the center point that is obtained in response to the representative value providing the best jitter value.

In accordance with a third embodiment of the present invention, the spherical aberration correction value and the focus bias value are adjusted to the center point that is obtained in response to not only the best representative value but also any of representative values providing a threshold value or smaller.

First and second examples of the third embodiment of the present invention are described below.

Figure 14:
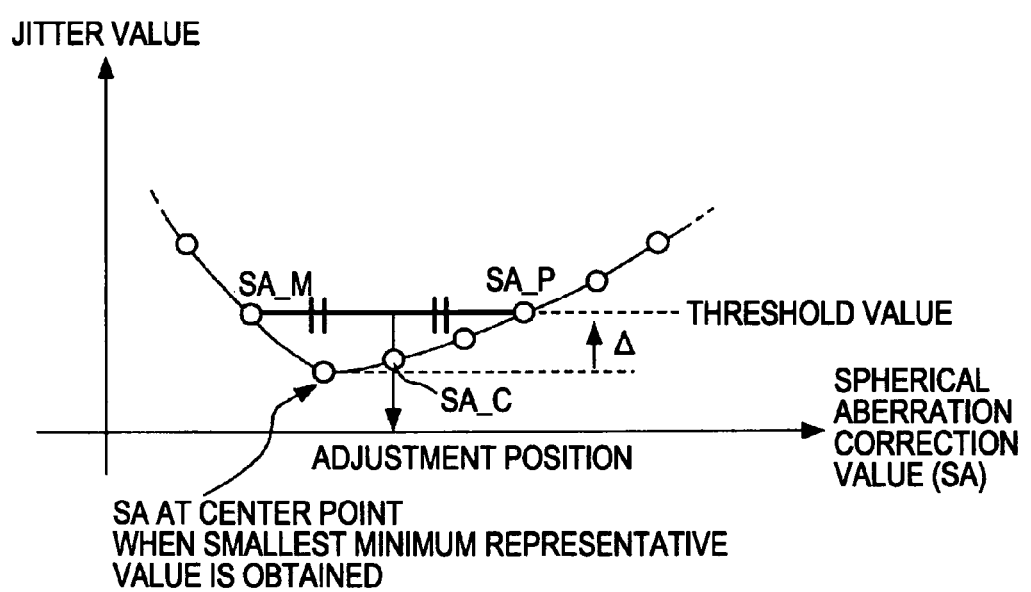
FIG. 14 illustrates an adjustment operation of the spherical aberration correction value in accordance with a first example of a third embodiment of the present invention.

FIG. 14 illustrates the first example of the third embodiment of the present invention.

As shown in FIG. 14, a distribution of the minimum representative values at each SA row is represented by blank circles with the spherical aberration correction value plotted in the abscissa and the focus bias value plotted in the ordinate.

In the first example, the operation to the acquisition of the best representative value (smallest minimum representative value) remains unchanged from the second embodiment of the present invention, and the discussion thereof is omitted herein.

In the first example, a threshold value set to the jitter value is the smallest minimum representative value+Δ. The center point is identified in response to the minimum representative value providing the jitter threshold value from among the minimum representative values determined on a per SA row basis. As shown in FIG. 14, the spherical aberration correction values from the identified center point spaced by Δ are referred to as SA_M and SA_P.

When the spherical aberration correction value SA_M and the spherical aberration correction value SA_P are identified, a spherical aberration correction value SA_C is calculated from "(SA_M+SA_P)/2."

With the spherical aberration correction value at the center point fixed to the spherical aberration correction value SA_C, a focus bias value FB_x at the center point that is obtained in response to the representative value providing the minimum representative value is determined by performing the searching process in the focus bias value direction.

The adjustment process is performed to the spherical aberration correction value SA_C and the focus bias value FB_x.

Variations, taking place in the jitter value measurement, can thus be covered in this way. Since the adjustment point is set based on the representative value providing the threshold value or lower, the adjustment process is performed to an appropriate position, as the margin center position Pm-cent, accounting for a margin for deviations in the focus and the spherical aberration after adjustment. In this process, the adjustment process is equally performed to the margin center position Pm-cent.

Figure 15:
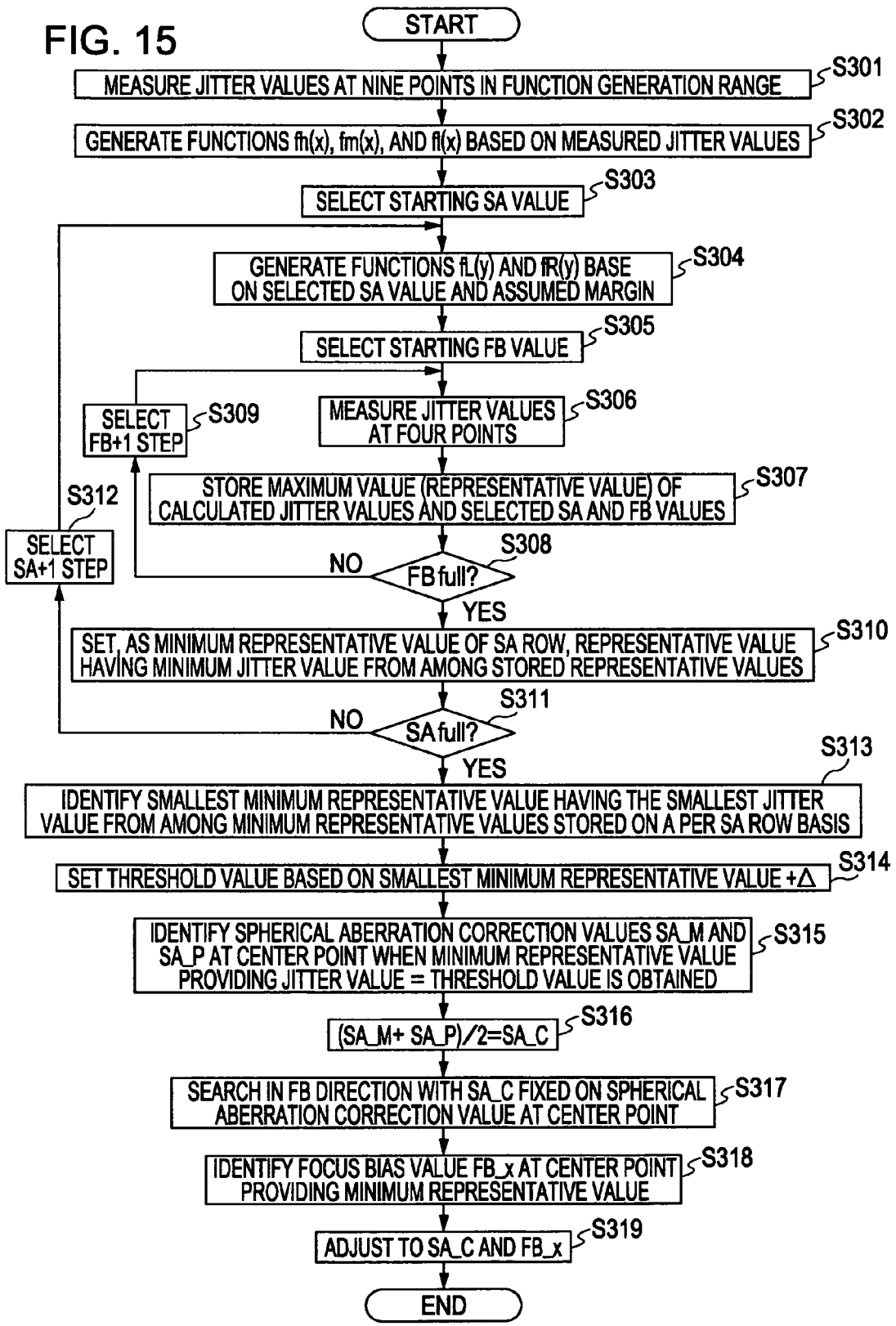
FIG. 15 is a flowchart illustrating the adjustment operation of the spherical aberration correction value in accordance with the first example of the third embodiment of the present invention.

The process of the first example of the third embodiment of the present invention is described below with reference to FIG. 15.

The system controller 60 of FIGS. 1 and 3 performs this process under the control of a program stored on the ROM or the like housed therewithin.

The process is performed on the premise that the optical disk 1 is loaded on the recording and reproducing apparatus and that the spherical aberration correction value and the focus bias value are set to those at the initial position Pfrst discussed with reference to FIG. 9.

Process steps in steps S301 through S313 are identical to the process performed to identify the best representative value (smallest minimum representative value) as in the second embodiment of the present invention described with reference to FIG. 13. Steps S301 through S313 are respectively identical to steps S201 through S213 of FIG. 13 and the discussion thereof is omitted herein.

In step S314, the threshold value is set to the smallest minimum representative value+Δ.

In step S315, the spherical aberration correction values SA_M and SA_P with respect to the center point that is obtained in response to the minimum representative value providing the jitter value=threshold value are identified.

Since information regarding the minimum representative value providing the jitter value=the threshold value and the center point is required, the memory for storing the information has a size enough to store the same number of rows as the number of SA rows.

In step S316, the spherical aberration correction value SA_C is determined from "(SA_M+SA_P)/2."

In step S317, the searching process is performed in the FB direction with the SA_C fixed to the spherical aberration correction value at the center point. More specifically, in response to the results of calculating the quadratic function f(y) with the focus bias value as the variable discussed in connection with the second embodiment of the present invention, the representative value is obtained at each shift point in the FB direction with the spherical aberration correction value at the center point fixed to SA_C.

In step S318, the focus bias value FB_x at the center point providing the minimum representative value is identified.

In step S319, the adjustment process is performed to the spherical aberration correction value SA_C and the focus bias value FB_x. More specifically, the spherical aberration correction value SA_C and the focus bias value FB_x are set to the spherical aberration correction value setter 20 and the focus bias setter 16, respectively.

The first example of the third embodiment of the present invention is performed with the smallest minimum representative value+Δ set as the threshold value. Alternatively, a predetermined fixed threshold value may be used. In such case, the process step of identifying the smallest minimum representative value is omitted. After performing the process to determine the minimum representative value at each SA row, step S315 and subsequent steps may be performed.

The minimum representative value is determined on a per SA row basis in the same manner as described with reference to FIG. 13. Variations in one dimension are thus covered with respect to the SA direction only. On the other hand, when the minimum representative value is determined for each FB column, the same operation is performed based on the minimum representative value obtained in the FB direction. Variations in one dimension are thus covered with reference to the FB direction.

Figure 16:
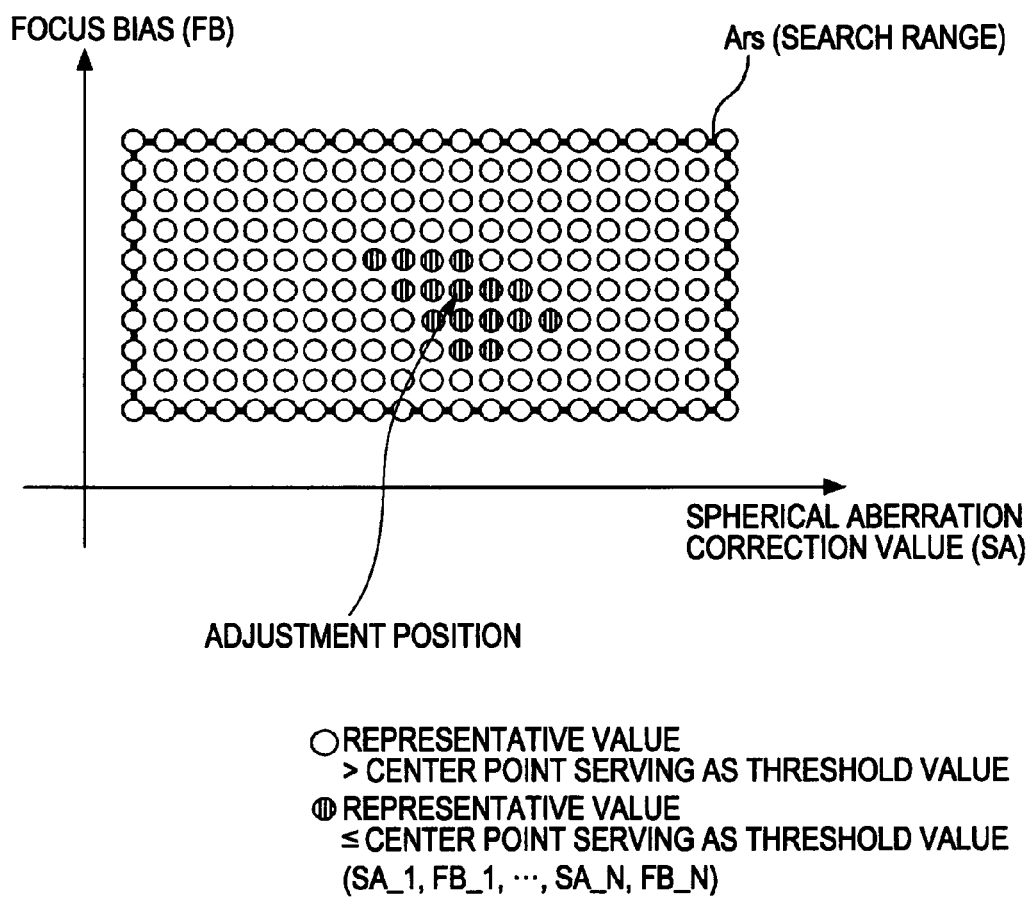
FIG. 16 illustrates an adjustment operation of the spherical aberration correction value in accordance with a second example of the third embodiment of the present invention.

FIG. 16 illustrates a second example of the third embodiment of the present invention.

As FIG. 4B, FIG. 16 illustrates a search area Ars with the spherical aberration correction value plotted in the abscissa and the focus bias value plotted in the ordinate. A plurality of blank circles show center points of the assumed margin W at shift points within the search area Ars.

The second example of the third embodiment of the present invention is also identical to the second embodiment of the present invention in the process to the determination of the smallest minimum representative value.

Unlike the first example in which variations are covered in one dimension only, namely, either the SA direction or the FB direction, variations are covered in two dimensions, namely, both in the SA direction and in the FB direction.

When the smallest minimum representative value is identified, a threshold is set to the smallest minimum representative value+Δ. Since two dimensional variations are covered, representative values equal to or smaller than the threshold value are identified from all representative values rather than identifying the minimum representative value at each SA row. Referring to FIG. 16, a distribution of center points of the representative values equal to or smaller than the threshold value is represented by hatched circles. Given the N center points of the representative values equal to or smaller than the threshold value, the values of the center points are now represented by SA_1, FB_1, ..., SA_N, FB_N.

When the center points SA_1, FB_1, ..., SA_N, FB_N providing the representative value equal to or smaller than the threshold value are identified, the spherical aberration correction value and the focus bias value are adjusted to the center of gravity of a two-dimensional plane constructed of the SA_1, FB_1, ..., SA_N, FB_N.

The spherical aberration correction value and the focus bias value at the position of the center of gravity are determined by calculating the following equation (3):

$$\frac{1}{N}\sum_{i=1}^{N} SA\_i, \frac{1}{N}\sum_{i=1}^{N} FB\_i \quad (3)$$

The adjustment process is thus made to the spherical aberration correction value and the focus bias value.

Since variations of the jitter value measurement are covered in accordance with the second example of the third embodiment of the present invention, variations in the adjustment value are reduced. In this case as well, since the adjustment point is set based on the representative value providing the threshold value or lower, the adjustment process is performed to an appropriate position, as the margin center position Pm-cent, accounting for a margin for deviations in the focus and the spherical aberration after adjustment. In this process, the adjustment process is equally performed to the margin center position Pm-cent.

Figure 17:
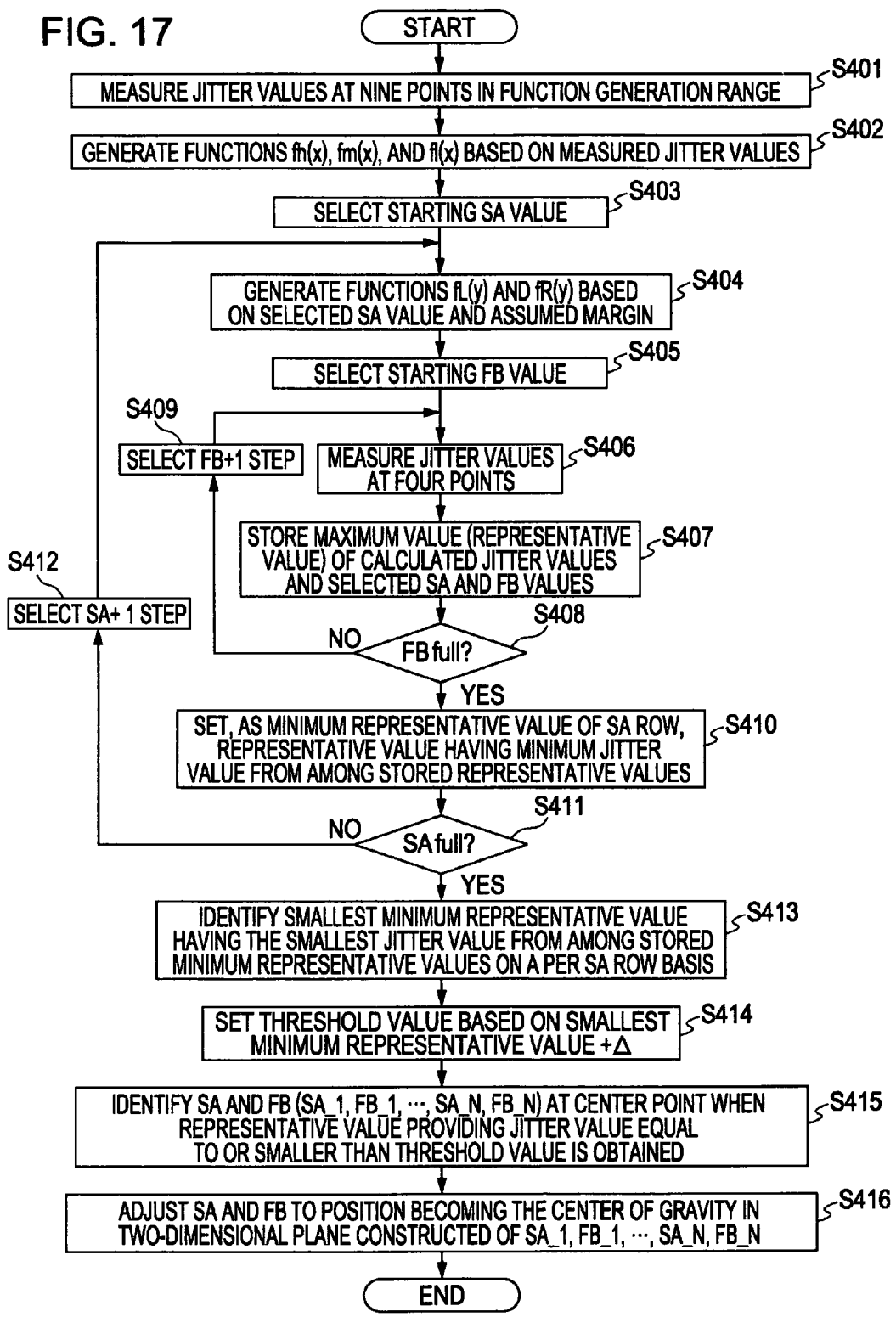
FIG. 17 is a flowchart illustrating the adjustment operation of the spherical aberration correction value in accordance with the second example of the third embodiment of the present invention.

The process of the second example of the third embodiment of the present invention is described below with reference to FIG. 17.

The system controller 60 of FIGS. 1 and 3 performs this process under the control of a program stored on the ROM or the like housed therewithin. The process is performed on the premise that the optical disk 1 is loaded on the recording and reproducing apparatus and that the spherical aberration correction value and the focus bias value are set to those at the initial position Pfrst discussed with reference to FIG. 9.

Process steps in steps S401 through S413 are identical to the process performed to identify the best representative value (smallest minimum representative value) as in the second embodiment of the present invention described with reference to FIG. 13. Steps S401 through S413 are respectively identical to steps S201 through S213 of FIG. 13 and the discussion thereof is omitted herein.

In step S414, the threshold value is set to the smallest minimum representative value+Δ.

In step S415, the spherical aberration correction value and the focus bias value at the center points (SA_1, FB_1, ..., SA_N, FB_N) providing the representative value equal to or smaller than the threshold value are identified.

As described above, the second example of the third embodiment of the present invention requires information regarding the representative value providing a jitter value equal to or smaller than the threshold value and the center point. The memory storing the information has a size enough to store all shift points within the search area Ars.

In step S416, the spherical aberration correction value and the focus bias value are adjusted to the center of gravity of a two-dimensional plane constructed of SA_1, FB_1, ..., SA_N, FB_N.

The spherical aberration correction value and the focus bias value at the position of the center of gravity are determined by calculating equation (3) based on SA_1, FB_1, ..., SA_N, FB_N. The adjustment process to the spherical aberration correction value and the focus bias value is performed by setting the spherical aberration correction value and the focus bias value to the spherical aberration correction value setter 20 and the focus bias setter 16, respectively.

In accordance with the second example of the third embodiment of the present invention, the smallest minimum representative value+Δ are used as the threshold value. In this case as well, a fixed predetermined threshold value may be employed. In such a case, the operation to identify the minimum representative value at each SA row and the smallest minimum representative value may be omitted. The representative value is determined at all shift points within the search area Ars and step S415 and subsequent steps may be performed.

The present invention is not limited to the above-described embodiments.

For example, the spherical aberration correction mechanism of the recording and reproducing apparatus includes one of the beam expander and the liquid-crystal display device. Alternatively, the recording and reproducing apparatus may include a spherical aberration correction mechanism employing a deformable mirror or any other technique.

In accordance with embodiments of the present invention, the reproducing apparatus is a recording and reproducing apparatus that records and reproduces data on a writable optical disk in a phase-change method. The reproducing apparatus may be a recording and reproducing apparatus that may only reproduce data from an playback only optical disk that records data using a combination of pit and land.

The value of the evaluation signal is the jitter value. Alternatively, the values of the evaluation signals may include an amplitude of a wobble signal, an amplitude value of an RF signal, an evaluation value of difference metric (value representing an error or a deviation from an ideal value when PRML is used in a binarize process).

Any other evaluation signal may be employed as long as the evaluation signal is obtained from light reflected from the disk and serves as an index of reproduced signal quality.

If the evaluation value of the difference metric is used, the techniques of the embodiments of the present invention are particularly useful because the contour line of the evaluation value is greatly deformed.

If the wobble signal value or the RF signal value is employed, the maximum value of the evaluation values becomes the best value while the minimum value of the evaluation values becomes the worst value. The relationship between the maximum and minimum values of the evaluation values is thus inverted from the above-described embodiments that use the jitter value. If the wobble signal value or the RF signal value is used, the word "minimum" is replaced with the word "maximum" while the word "maximum" is replaced with the "minimum" in the flowcharts of FIGS. 7, 13, 15, and 17. Furthermore, in the flowcharts of FIGS. 15 and 17, the phrase "the smallest minimum representative value+Δ" is replaced with the phrase "the smallest minimum representative value−Δ" (in steps S314 and S414), and the phrase "representative value equal to or smaller than the threshold value" is replaced with the phrase "representative value equal to or larger than the threshold value."

It should be understood by those skilled in the art that various modifications, combinations, sub-combinations and alterations may occur depending on design requirements and other factors insofar as they are within the scope of the appended claims or the equivalents thereof.

The invention claimed is:

1. A reproducing apparatus for reproducing data from a recording medium, comprising:
   head means for directing a laser light beam onto the recording medium and detecting laser light reflected from the recording medium to read the data, the head means having a focus servo mechanism and a spherical aberration correction mechanism for laser light;
   evaluation signal generating means for generating an evaluation signal serving as an index of quality of a reproduced signal based on the reflected light detected by the head means;

focus servo means for performing a focus servo operation by driving the focus servo mechanism in response to a focus error signal generated as a signal responsive to the reflected light detected by the head means;

spherical aberration correction means for performing spherical aberration correction by driving the spherical aberration correction mechanism in response to a spherical aberration correction value;

focus bias means for adding a focus bias to a focus loop containing the focus servo means; and control means for controlling adjustment of a spherical aberration correction value to be set in the spherical aberration correction means and a focus bias value to be set in the focus bias means, wherein when a center point of an assumed margin predetermined for each of the spherical aberration correction value and the focus bias value is shifted to a shift point within a first predetermined search range in a first tilt direction, the value of the evaluation signal is obtained at each of a plurality of predetermined points within the assumed margin with respect to each shift point, the evaluation signal having the worst value from among the plurality of predetermined points is set to have a representative value of each shift point, and the spherical aberration correction value to be set in the spherical aberration correction means and the focus bias value to be set in the focus bias means are adjusted based on the spherical aberration correction value and the focus bias value at the center point when any of the representative values of the shift points having a value of the evaluation signal that is better by a predetermined amount is obtained;

where the control means sets a second predetermined search range in a second tilt direction, the second tilt direction is different from the first tilt direction.

2. The reproducing apparatus according to claim 1, wherein the control means obtains the value of the evaluation signal at each of the plurality of predetermined points with respect to each shift point when the center point of the assumed margin shifts in the first tilt direction while storing as a first representative value the worst value of the evaluation values at the plurality of predetermined points with respect to each shift point, where the control means sets as the search range a predetermined range in the second tilt direction different from the first tilt direction, the control means sets the center point of the assumed margin as a starting point when one of the first representative values stored having the value of the evaluation signal that is better by a predetermined amount is obtained, obtains the value of the evaluation signal at each of the plurality of predetermined points with respect to each shift point when the center point of the assumed margin is shifted, and stores as a second representative value the worst value of the values of the evaluation signals at the plurality of predetermined points with respect to each shift point; and the control means sets in the spherical aberration correction means the spherical aberration correction value and sets in the focus bias means the focus bias value at the center point of the assumed margin when one second representative value having the value of the evaluation signal that is better by a predetermined amount is obtained from among the second representative values.

3. The reproducing apparatus according to claim 2, wherein the control means controls successive setting of the spherical aberration correction values at the plurality of predetermined points into the spherical aberration correction means and the focus bias values at the plurality of predetermined points into the focus bias means with the center point shifted in the first tilt direction when the value of the evaluation signal at each of the plurality of predetermined points is obtained with respect to each shift point, and inputs the value of the evaluation signal generated by the evaluation signal generating means with the spherical aberration correction value and the focus bias value set, and the control means controls successive setting of the spherical aberration correction values at the plurality of predetermined points into the spherical aberration correction means and the focus bias values at the plurality of predetermined points into the focus bias means with the center point shifted in the second tilt direction when the value of the evaluation signal at each of the plurality of predetermined points is obtained with respect to each shift point, and inputs the value of the evaluation signal generated by the evaluation signal generating means with the spherical aberration correction value and the focus bias value set.

4. The reproducing apparatus according to claim 1, wherein the control means controls successive setting of each of sets of spherical aberration correction values and focus bias values at a plurality of function generation measurement points into the spherical aberration correction means and the focus bias means, respectively, and inputs the value of the evaluation signal generated by the evaluation signal generating means with the spherical aberration correction values and the focus bias values set, thereby obtaining the values of the evaluation signal at the plurality of function generation measurement points, the control means generates a first quadratic function of one of a quadratic function having as a variable the spherical aberration correction value with respect to the value of the evaluation signal and a quadratic function having as a variable the focus bias value with respect to the value of the evaluation signal, based on one of the spherical aberration correction value and the focus bias value, each in combination with the value of the assessment signal at the corresponding measurement point, and the control means generates a second quadratic function of the value of the evaluation signal with the other one of the spherical aberration correction value and the focus bias value as a variable based on the first quadratic function, and calculates the value of the evaluation signal at the plurality of predetermined points within the assumed margin based on the second quadratic function when the center point of the assumed margin is shifted within the search range.

5. The reproducing apparatus according to claim 1, wherein the control means controls successive setting of each of sets of spherical aberration correction values and focus bias values at least nine function generation measurement points into the spherical aberration correction means and the focus bias means, respectively, the at least nine function generation measurement points being set in a grid extending in a spherical aberration correction value direction and in a focus bias value direction with at least three points in the spherical aberration correction value direction and at least three points in the focus bias value direction, and inputs the value of the evaluation signal generated by the evaluation signal generating means with the spherical aberration correction value and the focus bias value set, thereby obtaining the value of the evaluation signal from each of the function generation measurement points, the control means generates a first quadratic function based on at least three quadratic functions having as a variable the spherical aberration correction value with respect to the value of the evaluation signal or at least three quadratic functions having as a variable the focus bias value with respect to the value of the evaluation signal, based on one of the spherical aberration correction value and the focus bias value, each in combination with the value of the evaluation signal at each of the at least nine function generation measurement points from among the function generation measurement points, and the control means generates a second quadratic function of the value of the evaluation signal with the other one of the spherical aberration correction value and the focus bias value as a variable based on the first quadratic function, and calculates the value of the evaluation signal at the plurality of predetermined points within the assumed margin based on the second quadratic function when the center point of the assumed margin is shifted within the search range.

6. The reproducing apparatus according to claim 1, wherein the plurality of predetermined points include four corner points of the assumed margin.

7. The reproducing apparatus according to claim 1, wherein the plurality of predetermined points include four corner points of the assumed margin and each intermediate point between any two adjacent corner points.

8. A method of adjusting a spherical aberration correction value and a focus bias value in a reproducing apparatus for reproducing data from a recording medium, generating an evaluation signal serving as an index of quality of a reproduced signal based on light that is reflected from the recording medium in response a laser beam directed onto the recording medium, and setting a focus bias value and a spherical aberration correction value, the method comprising:

obtaining a value of the evaluation signal at each of a plurality of predetermined points within an assumed margin with respect to each shift point when the center point of the assumed margin predetermined for each of the spherical aberration correction value and the focus bias value is shifted to a shift point within a first predetermined search range in a first tilt direction;

setting the evaluation signal having the worst value from among the plurality of predetermined points to have a representative value with respect to each shift point; and adjusting the spherical aberration correction value based on a spherical aberration correction value and the focus bias value based on a focus bias value at the center point when any of the representative values of the shift points having a value of the evaluation signal that is better by a predetermined amount is obtained;

setting a second predetermined search range in a second tilt direction, the second tilt direction is different from the first tilt direction.

9. A reproducing apparatus for reproducing data from a recording medium, comprising:

a head unit operable to direct a laser light beam onto the recording medium and to detect laser light reflected from the recording medium to read the data, the head unit having a focus servo mechanism and a spherical aberration correction mechanism for laser light;

an evaluation signal generating unit operable to generate an evaluation signal serving as an index of quality of a reproduced signal based on the reflected light detected by the head unit;

a focus servo unit operable to perform a focus servo operation by driving the focus servo mechanism in response to a focus error signal generated as a signal responsive to the reflected light detected by the head unit;

a spherical aberration correction unit operable to perform spherical aberration correction by driving the spherical aberration correction mechanism in response to a spherical aberration correction value;

a focus bias unit operable to add a focus bias to a focus loop containing the focus servo unit; and a control unit operable to control adjustment of a spherical aberration correction value to be set in the spherical aberration correction unit and a focus bias value to be set in the focus bias unit, wherein when a center point of an assumed margin predetermined for each of the spherical aberration correction value and the focus bias value is shifted to a shift point within a first predetermined search range in a first tilt direction, the value of the evaluation signal is obtained at each of a plurality of predetermined points within the assumed margin with respect to each shift point, the evaluation signal having the worst value from among the plurality of predetermined points is set to have a representative value of each shift point, and the spherical aberration correction value to be set in the spherical aberration correction unit and the focus bias value to be set in the focus bias unit are adjusted based on the spherical aberration correction value and the focus bias value at the center point when any of the representative values of the shift points having a value of the evaluation signal that is better by a predetermined amount is obtained;

where the control unit is operable to set a second predetermined search range in a second tilt direction, the second tilt direction is different from the first tilt direction.

* * * * *